(12) United States Patent
Suzuki

(10) Patent No.: US 8,355,150 B2
(45) Date of Patent: Jan. 15, 2013

(54) INFORMATION PROCESSING APPARATUS, PROGRAM PRODUCT, AND RECORDING MEDIUM CAPABLE OF APPROPRIATELY EXECUTING AN OUTPUT PROCESS EVEN WHEN UNINTERPRETABLE INFORMATION IS INCLUDED IN OUTPUT SETTING INFORMATION

(75) Inventor: Katsunori Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1068 days.

(21) Appl. No.: 12/044,312

(22) Filed: Mar. 7, 2008

(65) Prior Publication Data
US 2008/0239373 A1 Oct. 2, 2008

(30) Foreign Application Priority Data

Mar. 30, 2007 (JP) ................................. 2007-093637

(51) Int. Cl.
*G06F 3/12* (2006.01)
*G06F 3/00* (2006.01)
*G06F 13/24* (2006.01)
*G06K 15/00* (2006.01)
*H04N 1/60* (2006.01)
*H04N 1/40* (2006.01)

(52) U.S. Cl. ...... 358/1.15; 358/1.16; 358/1.9; 358/3.23; 710/59; 710/260

(58) Field of Classification Search ................. 358/1.13, 358/1.15, 1.16, 1.9, 3.23; 710/8, 1, 59, 65, 710/260; 382/305, 103, 190, 116
See application file for complete search history.

(56) References Cited

U.S. PATENT DOCUMENTS

| 6,775,488 | B2 * | 8/2004 | Sawada | 399/45 |
| 6,879,408 | B1 * | 4/2005 | Hori et al. | 358/1.13 |
| 6,934,889 | B2 * | 8/2005 | Owari | 714/46 |
| 2003/0079063 | A1 * | 4/2003 | Iida et al. | 710/8 |
| 2004/0034862 | A1 * | 2/2004 | Kadota | 719/321 |
| 2006/0023244 | A1 * | 2/2006 | Mitsui | 358/1.13 |
| 2006/0139462 | A1 * | 6/2006 | Fukasawa et al. | 348/231.3 |
| 2006/0139661 | A1 * | 6/2006 | Kumashio | 358/1.1 |
| 2006/0239708 | A1 * | 10/2006 | Kozuka et al. | 399/75 |

FOREIGN PATENT DOCUMENTS

JP 2002-248831 9/2002

* cited by examiner

*Primary Examiner* — Benny Q Tieu
*Assistant Examiner* — Ngon Nguyen
(74) *Attorney, Agent, or Firm* — Oblon, Spivak, McClelland, Maier & Neustadt, L.L.P.

(57) ABSTRACT

A disclosed information processing apparatus, which is connected to an output device, detects, from output setting information, an uninterpretable setting that is uninterpretable by the information processing apparatus, according to the output setting information used when performing output and function information relevant to a function executable by the output device; displays a page for selecting an option of an interpretable setting that is interpretable by the information processing apparatus, which interpretable setting corresponds to the detected uninterpretable setting; and makes a correction for changing the uninterpretable setting to be the interpretable setting that is interpretable by the information processing apparatus according to the option selected in the displayed page.

11 Claims, 23 Drawing Sheets

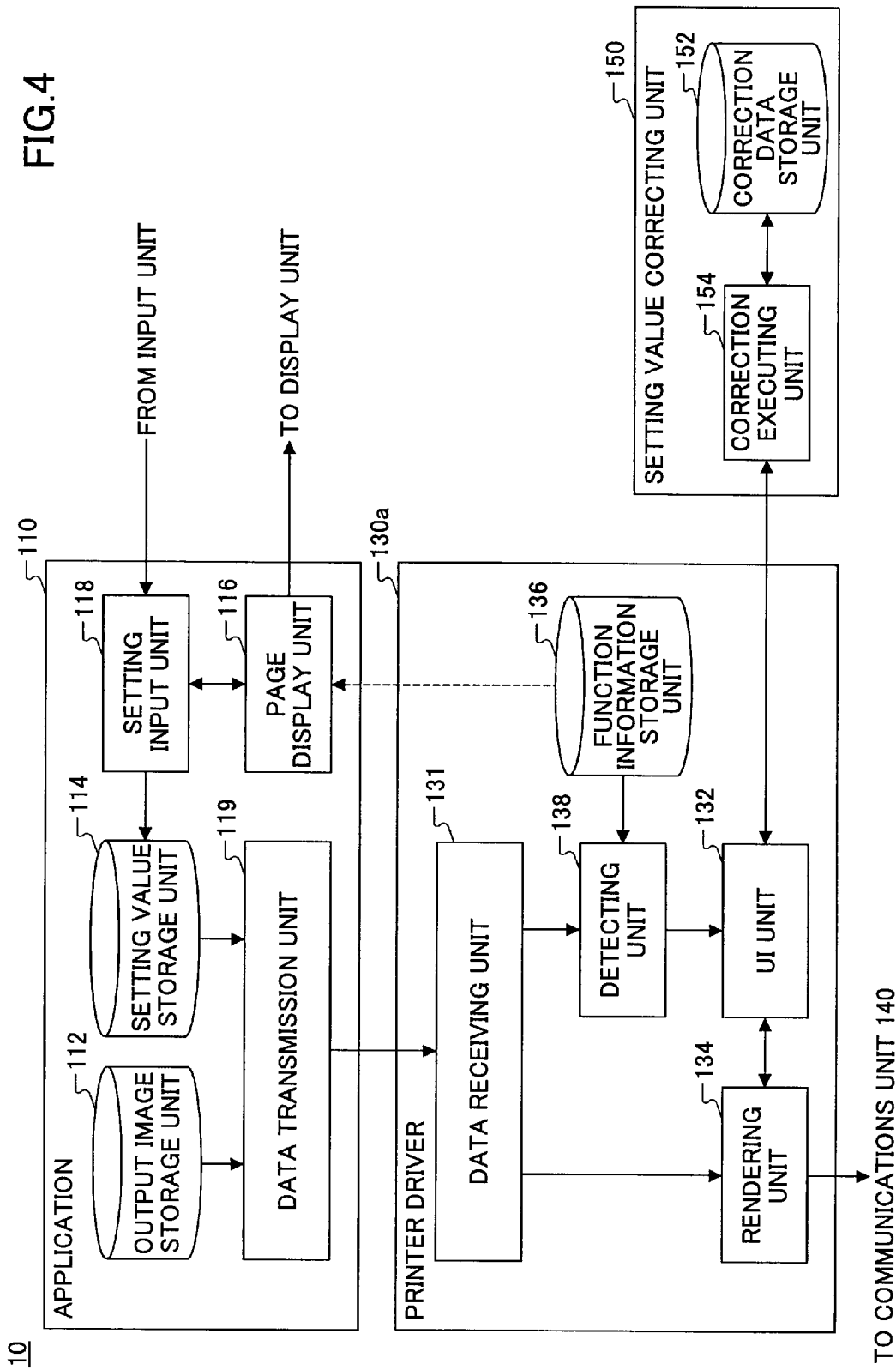

FIG.5A

```
<Capabilities>

<Feature:name="PaperSize" DisplayName="PAPER SIZE">

<Property:name="SelectionType">
      <Value:name="string">"PickOne"</Value>                    } 5140
    </Property>

<Option:name="A4" DisplayName="A4 : 210mmx297mm">
      <Property:name="MediaSizeX">
        <Value:name="integer">21000</Value>            } 5111
      </Property>
      <Property:name="MediaSizeY">                              } 5110
        <Value:name="integer">29700</Value>            } 5112
      </Property>
      <Property:name="Command">
        <Value:name="string">"SET MEDIASIZE=A4"</Value> } 5113
      </Property>
    </Option>

<Option:name="A3" DisplayName="A3 : 297mmx420mm">
      <Property:name="MediaSizeX">
        <Value:name="integer">29700</Value>
      </Property>
      <Property:name="MediaSizeY">
        <Value:name="integer">42000</Value>                     } 5120       } 5100
      </Property>
      <Property:name="Command">
        <Value:name="string">"SET MEDIASIZE=A3"</Value>
      </Property>
    </Option>

<Option:name="A5" DisplayName="A5 : 148mmx210mm">
      <Property:name="MediaSizeX">
        <Value:name="integer">14800</Value>
      </Property>
      <Property:name="MediaSizeY">
        <Value:name="integer">21000</Value>                     } 5130
      </Property>
      <Property:name="Command">
        <Value:name="string">"SET MEDIASIZE=A5"</Value>
      </Property>
    </Property>
    </Option>

</Feature>
```

```xml
<Feature:name="Duplex" DisplayName="DOUBLE-SIDED SETTING">

<Property:name="SelectionType">
     <Value:name="string">"PickOne"</Value>
   </Property>

<Option:name="OneSided" DisplayName="Off">
     <Property:name="DuplexMode">
       <Value:name=" string ">"Simplex"</Value>
     </Property>
     <Property:name="Command">
       <Value:name="string">"SET DUPLEX=OFF"</Value>
     </Property>
   </Option>

<Option:name="TwoSidedShortEdge" DisplayName="BIND ON SHORT SIDE">
     <Property:name="DuplexMode">
       <Value:name=" string ">"horizontal"</Value>
     </Property>
     <Property:name="Command">
       <Value:name="string">"SET DUPLEX=HORIZONTAL"</Value>
     </Property>
   </Option>

<Option:name="TwoSidedLongEdge" DisplayName="BIND ON LONG SIDE">
     <Property:name="DuplexMode">
       <Value:name=" string ">"vertical"</Value>
     </Property>
     <Property:name="Command">
       <Value:name="string">"SET DUPLEX=VERTICAL"</Value>
     </Property>
   </Option>

</Feature>

<Feature:name="Staple" DisplayName="STAPLE">

<Property:name="SelectionType">
     <Value:name="string">"PickOne"</Value>
   </Property>

<Option:name="Off" DisplayName="Off">
     <Property:name="StapleNumber">
       <Value:name="integer">0</Value>
     </Property>
     <Property:name="StaplePosition">
       <Value:name=" string ">"None"</Value>
     </Property>
     <Property:name="Command">
       <Value:name="string">"SET STAPLE=OFF"</Value>
     </Property>
   </Option>

<Option:name="TopLeft1point" DisplayName="TOP LEFT">
     <Property:name="StapleNumber">
       <Value:name="integer">1</Value>
     </Property>
     <Property:name="StaplePosition">
       <Value:name=" string ">"TopLeft"</Value>
     </Property>
     <Property:name="Command">
       <Value:name="string">"SET STAPLE=TOPLEFT"</Value>
     </Property>
   </Option>

<Option:name="TopRight1point" DisplayName="TOP LIGHT">
     <Property:name="StapleNumber">
       <Value:name="integer">1</Value>
     </Property>
     <Property:name="StaplePosition">
       <Value:name=" string ">"TopRight"</Value>
     </Property>
     <Property:name="Command">
       <Value:name="string">"SET STAPLE=TOPRIGHT"</Value>
     </Property>
   </Option>

</Feature>

</Capabilities>
```

50

5200

5300

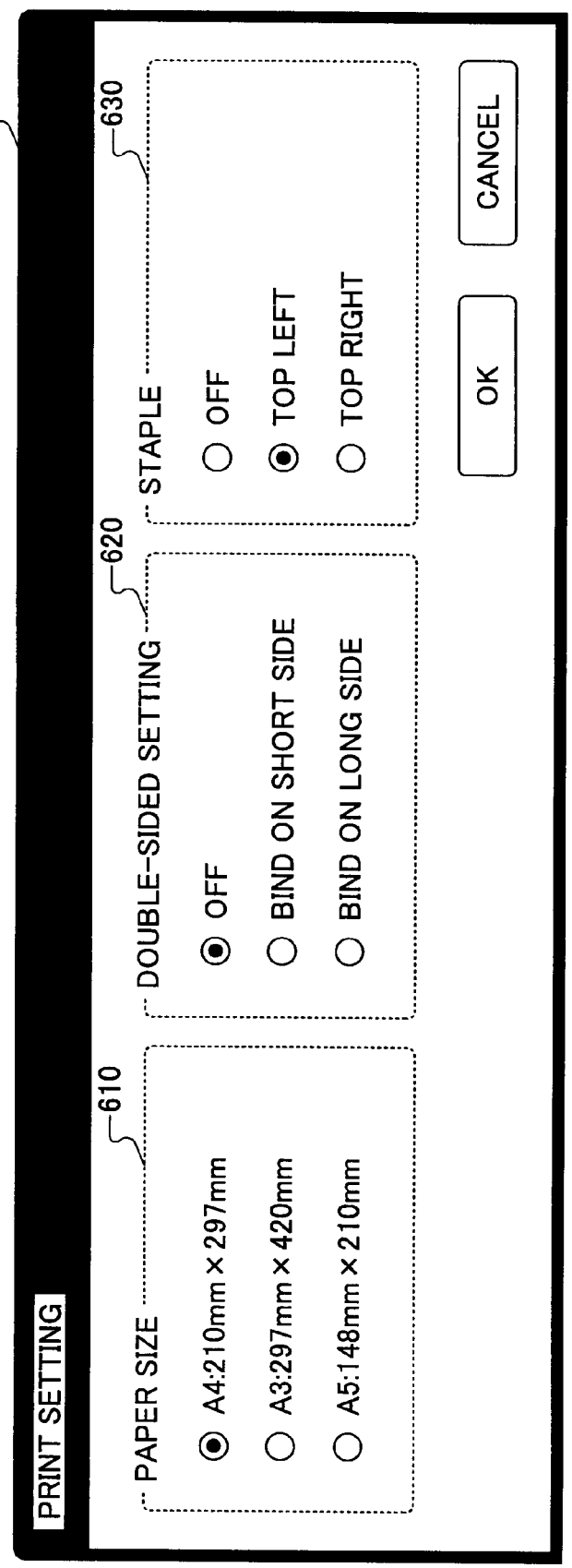

FIG.7

```
<Ticket>

<Feature:name="PaperSize" DisplayName="PAPER SIZE">

<Option:name="A4" DisplayName="A4 : 210mmx297mm">
      <Property:name="MediaSizeX">
        <Value:name="integer">21000</Value>
      </Property>
      <Property:name="MediaSizeY">
        <Value:name="integer">29700</Value>
      </Property>
      </Property>
      <Property:name="Command">
        <Value:name="string">"SET MEDIASIZE=A4"</Value>
      </Property>
    </Option>

</Feature>

<Feature:name="Duplex" DisplayName="DOUBLE-SIDED SETTING">

<Option:name="OneSided" DisplayName="Off">
      <Property:name="DuplexMode">
        <Value:name=" string ">"Simplex"</Value>
      </Property>
      </Property>
      <Property:name="Command">
        <Value:name="string">"SET DUPLEX=OFF"</Value>
      </Property>
    </Option>

</Feature>

<Feature:name="Staple" DisplayName="STAPLE">

<Option:name="TopLeft1point" DisplayName="TOP LEFT">
      <Property:name="StapleNumber">
        <Value:name="integer">1</Value>
      </Property>
      <Property:name="StaplePosition">
        <Value:name=" string ">"TopLeft"</Value>
      </Property>
      <Property:name="Command">
        <Value:name="string">"SET STAPLE=TOPLEFT"</Value>
      </Property>
    </Option>

</Feature>
</Ticket>
```

FIG.8

```
<Ticket>
  <Feature:name="PaperSize" DisplayName="PAPER SIZE">
    <Option:name="A4" DisplayName="A4">
      <Property:name="MediaWidth">
        <Value:name="integer">210</Value>
      </Property>
      <Property:name="MediaLength">
        <Value:name="integer">297</Value>
      </Property>
    </Property>
    <Property:name="Command">
      <Value:name="string">"SET PAPERSIZE=A4"</Value>
    </Property>
    </Option>

</Feature>

<Feature:name="Punch" DisplayName="PUNCH">

<Option:name="Off" DisplayName="Off">
      <Property:name="PunchNumber">
        <Value:name="integer">0</Value>
      </Property>
      <Property:name="PunchPosition">
        <Value:name=" string ">"None"</Value>
      </Property>
      <Property:name="Command">
        <Value:name="string">"SET PUNCH=OFF"</Value>
      </Property>
    </Option>

</Feature>

<Feature:name="Staple" DisplayName="STAPLE">

<Option:name="TopLeft1point" DisplayName="TOP LEFT">
      <Property:name="StapleNumber">
        <Value:name="integer">1</Value>
      </Property>
      <Property:name="StaplePosition">
        <Value:name=" string ">"TopLeft"</Value>
      </Property>
      <Property:name="Command">
        <Value:name="string">"SET STAPLE=TOPLEFT"</Value>
      </Property>
    </Option>

</Feature>
</Ticket>
```

FIG.10

```
(OMIT)
<Feature:name="PaperSize" DisplayName="PAPER SIZE">

<Option:name="A4" DisplayName="A4">
    <Property:name="MediaWidth">
        <Value:name="integer">210</Value>
    </Property>
    <Property:name="MediaLength">
        <Value:name="integer">297</Value>
    </Property>
    <Property:name="Command">
        <Value:name="string">"SET PAPERSIZE=A4"</Value>
    </Property>
</Option>

</Feature>
(OMIT)
<Feature:name="Punch" DisplayName="PUNCH">

<Option:name="Off" DisplayName="Off">
    <Property:name="PunchNumber">
        <Value:name="integer">0</Value>
    </Property>
    <Property:name="PunchPosition">
        <Value:name="string">"None"</Value>
    </Property>
    <Property:name="Command">
        <Value:name="string">"SET PUNCH=OFF"</Value>
    </Property>
</Option>

</Feature>
(OMIT)
```

| | | 300a |
|---|---|---|
| HISTORY ID | H1 | H2 |
| USER NAME | SUZUKI | SUZUKI |
| APPLICATION NAME | WORD | WORD |
| DOCUMENT NAME | Doc1 | Doc1 |
| TARGET MODEL | MOLEL A | MOLEL A |
| FEATURE BEFORE CORRECTION | PaperSize | Punch |
| OPTION BEFORE CORRECTION | <Option:name="A4" DisplayName="A4"><br>  <Property:name="MediaWidth"><br>    <Value:name="integer">210</Value><br>  </Property><br>  <Property:name="MediaLength"><br>    <Value:name="integer">297</Value><br>  </Property><br>  <Property:name="Command"><br>    <Value:name="string">"SET PAPERSIZE=A4"</Value><br>  </Property><br></Option> | <None> |
| FEATURE AFTER CORRECTION | PaperSize | <Ignore> |
| OPTION AFTER CORRECTION | <Option:name="A4" DisplayName="A4 : 210mmx297mm"><br>  <Property:name="MediaSizeX"><br>    <Value:name="integer">21000</Value><br>  </Property><br>  <Property:name="MediaSizeY"><br>    <Value:name="integer">29700</Value><br>  </Property><br></Property><br>  <Property:name="Command"><br>    <Value:name="string">"SET MEDIASIZE=A4"</Value> | <None> |

FIG.15

| REPEAT ID | SELECTING USER | HISTORY ID | REPEAT CONDITION |
|---|---|---|---|
| R1 | SUZUKI | H1 | VALID FOR DOCUMENT |
| ... | | | |

300b

INFORMATION PROCESSING APPARATUS, PROGRAM PRODUCT, AND RECORDING MEDIUM CAPABLE OF APPROPRIATELY EXECUTING AN OUTPUT PROCESS EVEN WHEN UNINTERPRETABLE INFORMATION IS INCLUDED IN OUTPUT SETTING INFORMATION

BACKGROUND OF THE INVENTION

1. Field of the Invention

The present invention relates to an information processing apparatus connected to an output device, and a program product and a recording medium in the information processing apparatus.

2. Description of the Related Art

If a computer such as a personal computer (PC) is connected to a peripheral device such as a printer, a scanner, or a facsimile machine (FAX) via a network or in a serial manner, the computer includes a device driver for converting data created or viewed with an installed application into data that can be interpreted by the peripheral device. For example, if the peripheral device is an image forming apparatus such as a laser printer (LP) or a multifunction peripheral (MFP), the computer typically has incorporated a printer driver dedicated to the image forming apparatus. Accordingly, the data created by the application are converted into page description language (PDL) data that can be interpreted by the image forming apparatus.

FIG. 21 is a functional block diagram of a computer in an image forming system according to the conventional technology.

A computer 1000 shown in FIG. 21 is capable of displaying a user interface (UI) that is based on an OS (Operating System) such as Windows (registered trademark). The computer 1000 is connected to a first printer 2010 and a second printer 2020 via a network 3000. The computer 1000 includes an application 1100 that is general-purpose software such as document creation software and spreadsheet software, an OS 1200, one or plural printer drivers 1310, 1320, . . . for converting an internal command from the OS 1200 into data that can be interpreted by the printer 2010 or the printer 2020, i.e., into so-called page description language (PDL) data, and a communications unit 1400 for transmitting/receiving data between each of the printers 2010, 2020 via the network 3000.

The application 1100 includes an output image storage unit 1102 for storing print data to be printed out by the printer 2010 or 2020, and a setting value storage unit 1104 for storing setting values regarding print setting items such as paper sizes, stapling, or trays.

For example, in a case where the OS 1200 is Windows®, the printer driver 1310 is divided into a user interface (UI) unit 1312 for displaying a page used for specifying the print setting for the printer 2010 to be used for the printing operation, and a rendering unit 1314 for converting data of, for example, a document created by the application 1100 into print data and attaching the contents set at the UI unit 1312 to the print data. Furthermore, in the printer driver 1310, a structure called DEVMODE is specified as a data structure for the rendering unit 1314 to receive contents set at the UI unit 1312. The other printer drivers also have the same configuration.

With reference to FIG. 22, a description is given of a print setting operation performed by the computer 1000 shown in FIG. 21 for printing document data created by the application 1100 with the first printer 2010 corresponding to the first printer driver 1310. FIG. 22 illustrates a print setting operation flow of the conventional computer shown in FIG. 21.

The OS 1200 has a role of hiding, from the application 1100, which printer driver is being used. Therefore, all requests made by the application 1100 of the printer driver 1310 are given via the OS 1200.

First, in step S1001, the user makes a print request for the first printer 2010 with the use of an input device (not shown) such as a keyboard or a mouse. Specifically, if the OS is Windows®, the print request is executed as the user selects "print" from a drop-down menu of "file" when the document data are open.

Upon receiving the print request from the user, in step S1002, the application 1100 requests the OS 1200 to provide size information in order to secure a region of a certain size for saving print setting values. In step S1003, the OS 1200 requests the first printer driver 1310, which is to be used corresponding to the first printer 2010, to provide the size information. Upon receiving this request, in step S1004, the printer driver 1310 sends, to the OS 1200, information on the region size necessary for saving the print setting values. In step S1005, the OS 1200 sends, to the application 1100, information on the region size received from the printer driver 1310. Based on this information, in step S1006, the application 1100 secures the necessary region size in its setting value storage unit 1104.

Next, in step S1007, the application 1100 requests the OS 1200 to write a standard value (default value) into the secured region. In step S1008, the OS 1200 makes the same request of the printer driver 1310. In step S1009, the printer driver 1310 sends information on the standard setting value to the OS 1200. In step S1010, the OS 1200 writes the information on the standard setting value received from the printer driver 1310 in a predetermined region in the setting value storage unit 1104 of the application 1100.

Before the printing operation, in step S1011, the application 1100 requests the OS 1200 to prompt the user to change the print setting. Specifically, if the OS is Windows®, this setting change request is executed as the user selects "property" in a page displayed upon selecting "print" from a drop-down menu of "file" when the document data are open. In step S1012, the OS 1200 makes the same request of the printer driver 1310. Upon receiving this request, in step S1013, the printer driver 1310 displays a print setting page with the UI unit 1312. As the user inputs desired values in the items of print settings by following this page, in step S1014, the printer driver 1310 changes the setting values to the values input by the user. Subsequently, in step S1015, the printer driver 1310 sends the changed setting values to the OS 1200. In step S1016, the OS 1200 sends the setting values received from the printer driver 1310 to the application 1100. In step S1017, the application 1100 saves, in the setting value storage unit 1104, the setting values that have been received from the printer driver 1310 via the OS 1200. Instead, the application 1100 may save the setting values in the output image storage unit 1102 together with document data.

Subsequently, in step S1018, the application 1100 assigns the setting values received from the printer driver 1310 via the OS 1200 as setting values for the current printing operation, and instructs performing a printing operation. In step S1019, the printing instruction from the application 1100 is sent to the printer driver 1310 via the OS 1200. Upon receiving this printing instruction, in step S1020, the printer driver 1310 generates, with the rendering unit 1314, data that can be interpreted by the corresponding first printer 2010 based on the print setting values changed by the user. Finally, the data generated by the printer driver 1310 are sent by the communications unit 1400 to the first printer 2010 via the network 3000.

As described above, in the process of executing a printing operation, the computer 1000 saves the print setting values in a predetermined format such as the DEVMODE structure (step S1017). The method of saving the print setting values varies among different manufacturers and different models of printer drivers. For example, a printer driver of a certain model may assign a specific number for a paper size, while a printer driver of another model may set values for the length and width of the sheet of paper. Furthermore, depending on the application, the print setting values may be saved together with document data.

In such a case, the saved print setting values correspond to those of a printer of another model. Therefore, the sequence of processes up to step S1014, in which the print setting values are changed according to user input, is omitted. If a printing instruction is given, the printer driver simply receives from the application print setting values corresponding to the printer of another model. However, these print setting values may include information that cannot be interpreted (uninterpretable) by the printer driver.

In order to overcome such a situation where information that is uninterpretable by the printer driver is included, for example, Japanese Laid-Open Patent Application No. 2002-248831 (Patent Document 1) discloses the following image forming apparatus. Specifically, in the disclosed image forming apparatus, even if there is an invalid print setting value that is uninterpretable by the printer driver, the invalid print setting value is set as a standard value (default value) so that the printing job is not interrupted and high processing efficiency is realized.

Patent Document 1: Japanese Laid-Open Patent Application No. 2002-248831

However, the image forming apparatus disclosed in Patent Document 1 has the following problem. That is, the actual printed results may not be as expected by the user, because the information that is uninterpretable by the printer driver is corrected (changed) to a standard value in order to continue the process. Furthermore, it is extremely difficult to develop an application that can detect whether information will not be interpreted by the printer driver. Realistically, it is not possible to make the user recognize that an application saves the print setting values together with document data.

SUMMARY OF THE INVENTION

The present invention provides an information processing apparatus, a program product, and a recording medium in which one or more of the above-described disadvantages are eliminated.

A preferred embodiment of the present invention provides an information processing apparatus, a program product, and a recording medium capable of appropriately executing an output process even when uninterpretable information is included in output setting information.

An embodiment of the present invention provides an information processing apparatus connected to an output device, the information processing apparatus including a function information storage unit configured to store function information relevant to a function executable by the output device; a receiving unit configured to receive output setting information used when performing output; a detecting unit configured to detect, from the output setting information, an uninterpretable setting that is uninterpretable by the information processing apparatus, according to the output setting information received by the receiving unit and the function information stored in the function information storage unit; a display unit configured to display a page for selecting an option of an interpretable setting that is interpretable by the information processing apparatus, which interpretable setting corresponds to the uninterpretable setting detected by the detecting unit; and a correcting unit configured to make a correction for changing the uninterpretable setting into the interpretable setting that is interpretable by the information processing apparatus according to the option selected in the page displayed by the display unit.

An embodiment of the present invention provides a program product including instructions for causing an information processing apparatus connected to an output device to perform a detecting step of detecting, from output setting information, an uninterpretable setting that is uninterpretable by the information processing apparatus, according to the output setting information used when performing output and function information relevant to a function executable by the output device; a displaying step of displaying a page for selecting an option of an interpretable setting that is interpretable by the information processing apparatus, which interpretable setting corresponds to the uninterpretable setting detected in the detecting step; and a correcting step of making a correction for changing the uninterpretable setting into the interpretable setting that is interpretable by the information processing apparatus according to the option selected in the page displayed in the displaying step.

According to one embodiment of the present invention, an information processing apparatus, a program product, and a recording medium are provided, which are capable of appropriately executing an output process even when a setting that is uninterpretable is included in output setting information, because such a setting is not simply changed into a standard value but is changed into a setting that can be interpreted by the information processing apparatus, and that is selected by a user.

BRIEF DESCRIPTION OF THE DRAWINGS

Other objects, features and advantages of the present invention will become more apparent from the following detailed description when read in conjunction with the accompanying drawings, in which:

FIG. 4 illustrates an example of a more detailed functional configuration of the PC according to the first embodiment of the present invention;

FIGS. 5A and 5B illustrate an example of a function information schema stored in a printer driver according to the first embodiment of the present invention;

FIG. 6 illustrates an example of a print setting page displayed based on the function information schema shown in FIGS. 5A and 5B;

FIG. 7 illustrates an example of a data structure of print setting information generated by an application in a case where the user makes print settings according to the print setting page shown in FIG. 6;

FIG. 8 illustrates an example of a data structure of print setting information based on the function information schema that is stored in another printer driver according to the first embodiment of the present invention;

FIG. 10 indicates detected uninterpretable items in the print setting information shown in FIG. 8;

FIG. 13 illustrates an example of the data structure of correction history data according to the first embodiment of the present invention;

FIG. 15 illustrates an example of the data structure of repeat setting data according to the first embodiment of the present invention;

DETAILED DESCRIPTION OF THE PREFERRED EMBODIMENTS

A description is given, with reference to the accompanying drawings, of an embodiment of the present invention.
<First Embodiment>
(Configuration)

Figure 1:
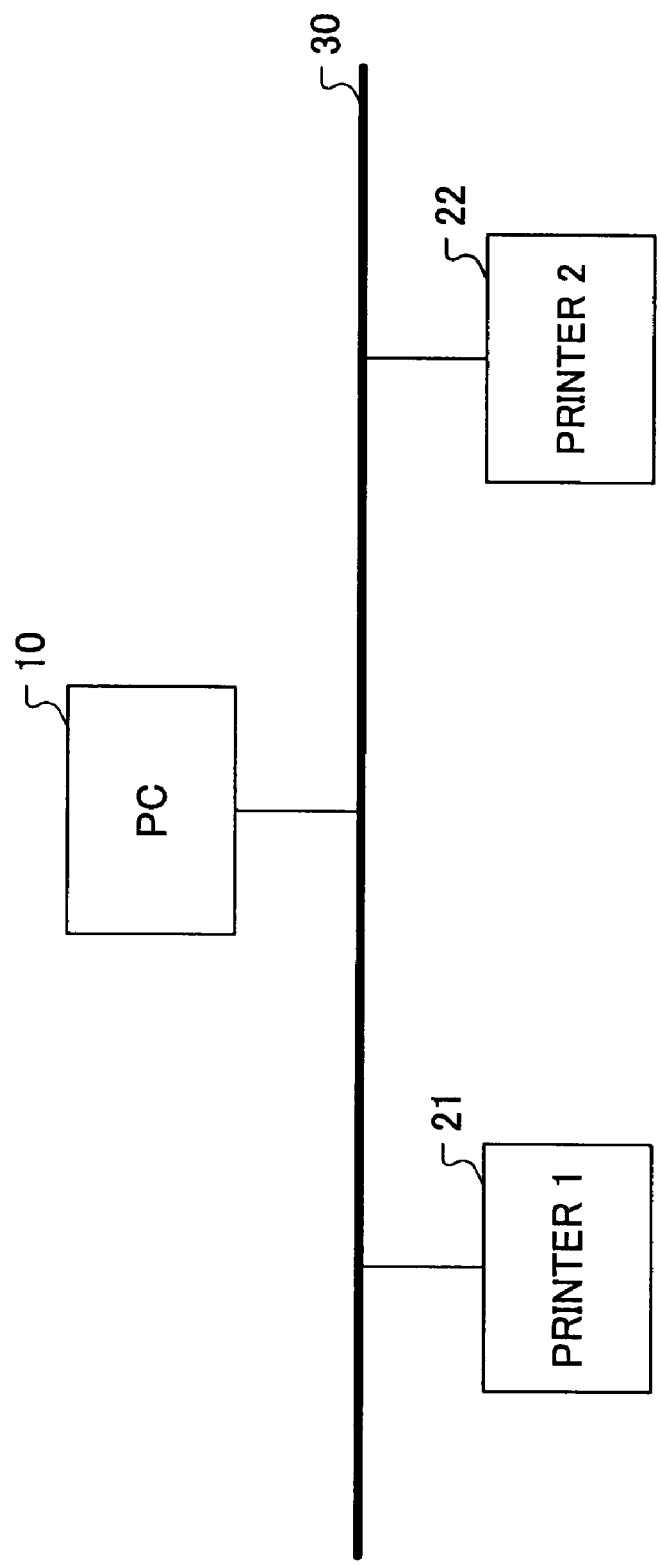
FIG. 1 illustrates an example of an image forming system according to a first embodiment of the present invention.

FIG. 1 illustrates an example of an image forming system including a personal computer (hereinafter, simply referred to as "PC") according to an embodiment of the present invention.

In FIG. 1, an image forming system 1 includes a PC 10, a first printer 21 and a second printer 22 as examples of output devices, and a network 30 that connects these elements to each other to enable data communications.

The PC 10 is capable of displaying a user interface (UI) based on an OS (Operation System). The PC 10 can be another type of computer such as a PDA (Personal Digital Assistant) or a mobile phone.

The first and second printers 21 and 22 perform a printing process based on a request from the PC 10. The first and second printers 21 and 22 are, for example a laser printer (LP) or a multifunction peripheral (MFP). To facilitate understanding, it is assumed that the first and second printers 21 and 22 are different models.

FIG. 1 illustrates only one PC and two printers; however, there can actually be more PCs and printers. Furthermore, the PC and the printers can be connected by a network such as a local area network (LAN) or the Internet as shown in FIG. 1, or they can be connected in a serial manner by USB, etc.

Figure 2:
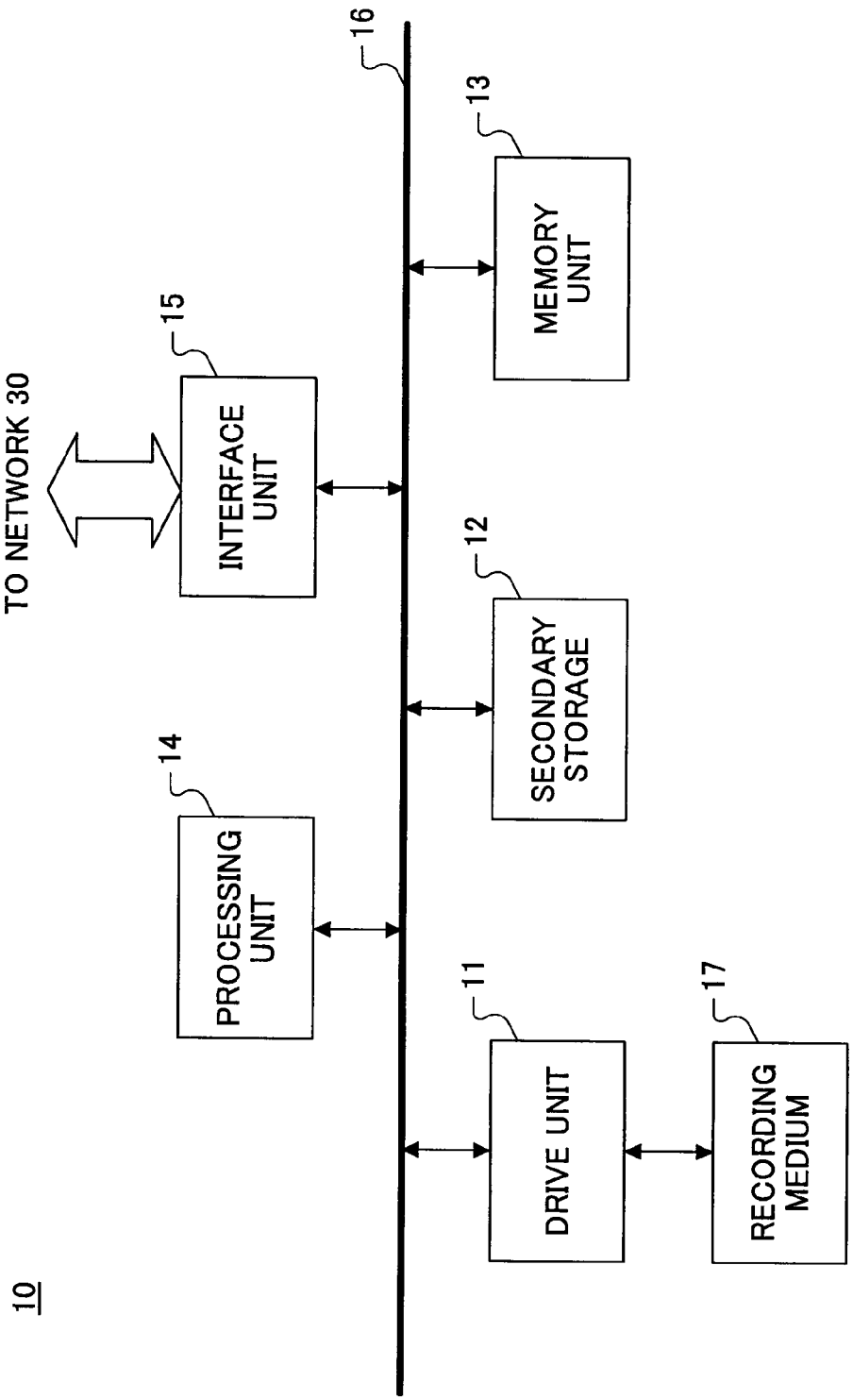
FIG. 2 illustrates an example of a hardware configuration of a PC according to the first embodiment of the present invention.

FIG. 2 illustrates an example of a hardware configuration of the PC 10 shown in FIG. 1. As shown in FIG. 1, the PC 10 includes a drive unit 11, a secondary storage 12, a memory unit 13, a processing unit 14, and an interface unit 15, which are interconnected by a bus 16. A program for realizing a process in the PC 10 is provided by a recording medium 17 such as a CD-ROM.

The drive unit 11 is for reading the recording medium 17. When the recording medium 17 in which a program is recorded is loaded in the drive unit 11, the program is installed from the recording medium 17 into the secondary storage 12 via the drive unit 11. In the present embodiment, a device driver for outputting information to an output unit is applicable as a program recorded in a recording medium; however, to facilitate understanding, a printer driver is taken as an example in the description.

The secondary storage 12 is for storing the installed program as well as necessary files and data. The memory unit 13 is for reading a program from the secondary storage 12 and holding it when there is an instruction to activate the program. The processing unit 14 is for executing functions of the PC 10 according to the program held by the memory unit 13. The interface unit 15 is for connecting the PC 10 to the network 30 shown in FIG. 1.

Figure 3:
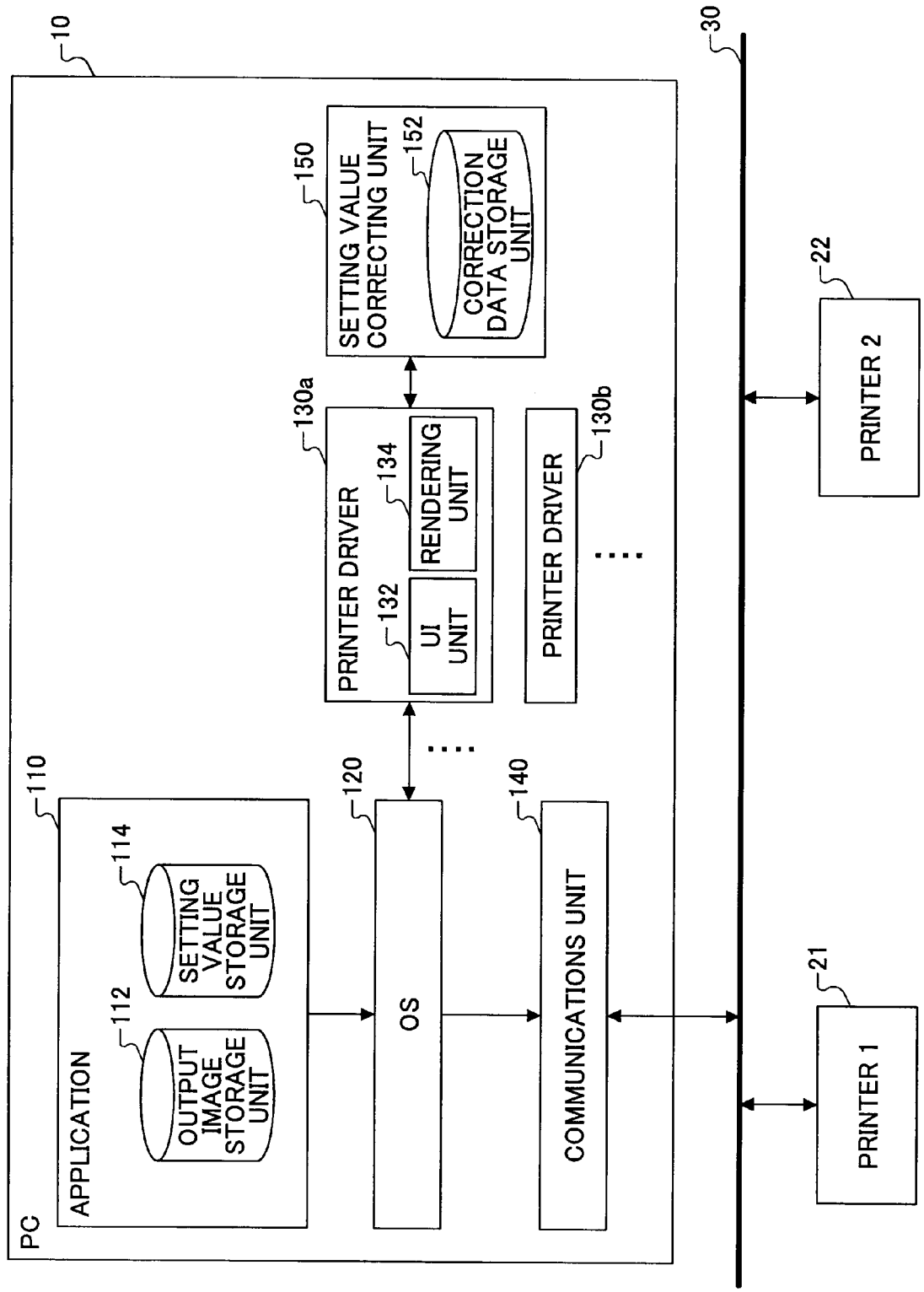
FIG. 3 illustrates an example of a functional configuration of the PC according to the first embodiment of the present invention.

FIG. 3 illustrates an example of a functional configuration of the PC 10 shown in FIG. 1.

In FIG. 3, the PC 10 is connected to the first and second printers 21 and 22 via the network 30. The PC 10 includes an application 110 that is general-purpose software such as document creation software and spreadsheet software, an OS (Operating System) 120 such as Windows®, one or plural printer drivers 130a, 130b, . . . for converting an internal command from the OS 120 into data that can be interpreted by the printer 21 or the printer 22, i.e., into so-called page description language (PDL) data, a communications unit 140 for transmitting/receiving data between each of the printers 21, 22 via the network 30, and a setting value correcting unit 150 for correcting an item to have an appropriate value that can be interpreted by a printer driver when print setting information sent from the application 110 to the printer driver 130a or 130b includes an item or a value that is uninterpretable by that printer driver.

The application 110 includes an output image storage unit 112 for storing document data to be printed out by the printer 21 or 22, and a setting value storage unit 114 for storing print setting contents including setting values regarding print setting items such as paper sizes, stapling, or trays.

For example, in a case where the OS 120 is Windows®, the printer driver 130a is divided into a user interface (UI) unit 132 for displaying a page used for specifying the print settings, and a rendering unit 134 for converting document data created by the application 110 into print data and attaching the contents set at the UI unit 132 to the print data. Furthermore, in the printer driver 130a, a structure called DEVMODE is specified as a data structure for the rendering unit 134 to receive contents set at the UI unit 132. The other printer drivers also have the same configuration. In the present embodiment, the first printer driver 130*a* corresponds to the first printer 21 and the second printer driver 130*b* corresponds to the second printer 22.

The setting value correcting unit 150 includes a correction data storage unit 152 for storing, as correction history data, contents of corrections made with respect to information that is uninterpretable by a target printer driver.

FIG. 4 illustrates an example of a more detailed functional configuration of the PC 10 shown in FIG. 1. In FIG. 4, the PC 10 includes the application 110, the printer driver 130*a*, and the setting value correcting unit 150.

In addition to the output image storage unit 112 and the setting value storage unit 114 shown in FIG. 3, the application 110 includes a page display unit 116, a setting input unit 118, and a data transmission unit 119. The page display unit 116 has a role of causing a display device (not shown) to display document data created by the application 110 and a relevant page. The setting input unit 118 has a role of receiving data input by a user by following the page displayed by the page display unit 116 with the use of an input device (not shown) such as a keyboard or a mouse. The data transmission unit 119 has a role of sending, to the printer driver 130*a*, print data stored in the output image storage unit 112 and output data including corresponding print setting contents stored in the setting value storage unit 114.

In addition to the UI unit 132 and the rendering unit 134 shown in FIG. 3, the first printer driver 130*a* includes a data receiving unit 131, a function information storage unit 136, and a detecting unit 138. The data receiving unit 131 has a role of receiving output data sent from the application 110. The function information storage unit 136 has a role of storing function information of the first printer 21 corresponding to the printer driver 130*a*. The detecting unit 138 has a role of referring to the function information stored in the function information storage unit 136 to detect an uninterpretable item or value in the print setting contents included in the output data received by the data receiving unit 131. Although not shown in FIG. 4, the second printer driver 130*b* also has basically the same configuration.

In addition to the correction data storage unit 152 shown in FIG. 3, the setting value correcting unit 150 includes a correction executing unit 154. The correction executing unit 154 has a role of correcting, according to a user's instruction, an uninterpretable item or value that has been detected by the detecting unit 138 of the printer driver 130*a*.

(Data Structure)

FIGS. 5A and 5B illustrate an example of a function information schema 50 stored in the function information storage unit 136 of the printer driver 130*a*. FIGS. 5A and 5B are unified, and the function information schema 50 is illustrated as continuous data over FIGS. 5A and 5B. Furthermore, in the present embodiment, the function information schema 50 is described in an XML (Extensible Markup Language) format.

The function information schema 50 shown in FIGS. 5A and 5B is a data structure defining functions of the first printer 21 corresponding to the printer driver 130*a* and option setting values of such functions. Functions that can be set are described between the <Capabilities> tag at the beginning of the data and the </Capabilities> tag at the end of the data. The function information schema 50 includes, in between <Capabilities> and </Capabilities> tags, a paper size setting item 5100, a double-side setting item 5200, and a staple setting item 5300. Each of these setting items 5100, 5200, and 5300 is described between <Feature> and </Feature> tags. The <Feature> that is first described is actually described as <Feature:name="PaperSize" DisplayName="paper size"> as shown in FIG. 5A. The description name="PaperSize" is a function name that can be recognized by a computer. The description DisplayName="paper size" is displayed on a display device, and is a function name that can be recognized by a user.

For example, among the above items, the "sheet size" setting item 5100 includes options 5110, 5120, and 5130 to be selected for this setting item. Each of the options 5110, 5120, and 5130 is described between the tags <Option> and </Option>.

Furthermore, among these options, in the option 5110, the <Option> that is first described is actually described as <Option:name="A4" DisplayName="A4:210 mm×297 mm"> as shown in FIG. 5A. The description name="A4" is a function name that can be recognized by a computer. The description DisplayName="A4:210 mm×297 mm" is displayed on a display device, and is a function name that can be recognized by a user.

The option 5110 includes attributes 5111, 5112, and 5113 of this option. Each of these attributes 5111, 5112, and 5113 is described between <Property> and </Property> tags, and a value "Value" is defined for uniquely defining the option 5110.

The "sheet size" setting item 5100 further includes an attribute 5140 of the setting item. The attribute 5140 is also described between <Property> and </Property> tags, and defines a setting method for the setting item such as a combo box, a check box, or an input value. In the present embodiment, the setting method is to be selected from the options included in the setting item.

The other setting items 5200 and 5300 and their respective options are also described in the same manner.

When the user performs a print request that accompanies print settings, the application 110 displays a print setting page based on this function information schema 50, with the use of the page display unit 116.

FIG. 6 illustrates an example of a print setting page displayed by the application 110 based on the function information schema 50 shown in FIGS. 5A and 5B.

A print setting page 60 shown in FIG. 6 includes a first group box 610 including options for setting "paper size", a second group box 620 including options for setting "double-sided printing", and a third group box 630 including options for setting "staple". The first group box 610 is displayed based on the sheet size setting item 5100, the second group box 620 is displayed based on the double-side setting item 5200, and the third group box 630 is displayed based on the staple setting item 5300, which setting items are included in the function information schema 50 shown in FIGS. 5A and 5B. The options included in each group box correspond to the options defined in each corresponding setting item included in the function information schema 50.

The user sets the functions of the first printer 21 to be used for the printing operation with the print setting page 60. In the present embodiment, the user can make a print setting for the printing operation by selecting an option from among plural options. Upon receiving such a print setting, the application 110 stores the print setting information as shown in FIG. 7 in the setting value storage unit 114 with the use of the setting input unit 118.

FIG. 7 illustrates an example of a data structure of print setting information 70 that is stored in the setting value storage unit 114 of the application 110 in a case where the user makes print settings with the print setting page 60 shown in FIG. 6.

The print setting information 70 shown in FIG. 7 is a data structure showing print setting contents for the functions of the printer 21 corresponding to the first printer driver 130*a*.

Setting contents of the functions are described between the <Ticket> tag at the beginning of the data and the </Ticket> tag at the end of the data. The print setting information 70 includes, in between <Ticket> and </Ticket> tags, a sheet size setting item 7100, a double-side setting item 7200, and a staple setting item 7300. Each of these setting items 7100, 7200, and 7300 is described between <Feature> and </Feature> tags. As in the case of the function information schema 50 shown in FIGS. 5A and 5B, in each of these setting items, <Feature> that is first described includes a function name that can be recognized by a computer and a function name displayed on a display device that can be recognized by a user.

For example, among the above items, the sheet size setting item 7100 includes an option 7110 for this setting item, which option 7110 corresponds to the option selected by the user according to the print setting page 60 shown in FIG. 6. For example, in the print setting page 60 shown in FIG. 6, when an option "A4" is selected from among the options for setting the paper size included in the first group box 610, the option 7110 is the option 5110 corresponding to the option "A4" among the options 5110, 5120, and 5130 included in the sheet size setting item 5100 of the function information schema 50 of FIGS. 5A and 5B.

The other setting items 7200 and 7300 and their respective options are also described in the same manner.

The print setting information 70 is stored in the setting value storage unit 114 of the application 110, and is then sent to the first printer driver 130a corresponding to the printer 21 to be used for the printing operation together with document data to be printed out.

FIG. 8 illustrates an example of a data structure of print setting information 80 based on the function information schema that is stored in the second printer driver 130b.

The print setting information 80 shown in FIG. 8 is a data structure showing setting contents for the functions of the second printer 22 corresponding to the second printer driver 130b. In the same manner as the print setting information 70 shown in FIG. 7, setting contents of the functions are described between the <Ticket> tag at the beginning of the data and the </Ticket> tag at the end of the data. The print setting information 80 includes, in between <Ticket> and </Ticket> tags, a sheet size setting item 8100, a punch setting item 8200, and a staple setting item 8300. Each of these setting items 8100, 8200, and 8300 is described between <Feature> and </Feature> tags.

In the present embodiment, the first printer 21 and the second printer 22 are different models. Accordingly, although the print setting information 80 shown in FIG. 8 includes the sheet size setting item 8100 similar to that of the print setting information 70 shown in FIG. 7, there are differences between the print setting information 80 and the print setting information 70. Specifically, an option 8110 of the sheet size setting item 8100 includes attributes described in a different manner. Moreover, the print setting information 80 includes the punch setting item 8200 that is not included in the print setting information 70 shown in FIG. 7.

(Operation)

Next, a description is given of an operation of correcting the print setting information performed by the PC 10. This correction is executed after document data have been printed out with a certain printer, and when the user makes a print request for printing out the same document data with a printer of a different model without accompanying specification of print settings. Specifically, a "print request without accompanying specification of print settings" corresponds to a print instruction made by clicking an icon of the printer displayed on a tool bar if the OS is, for example, Windows®.

Figure 9:
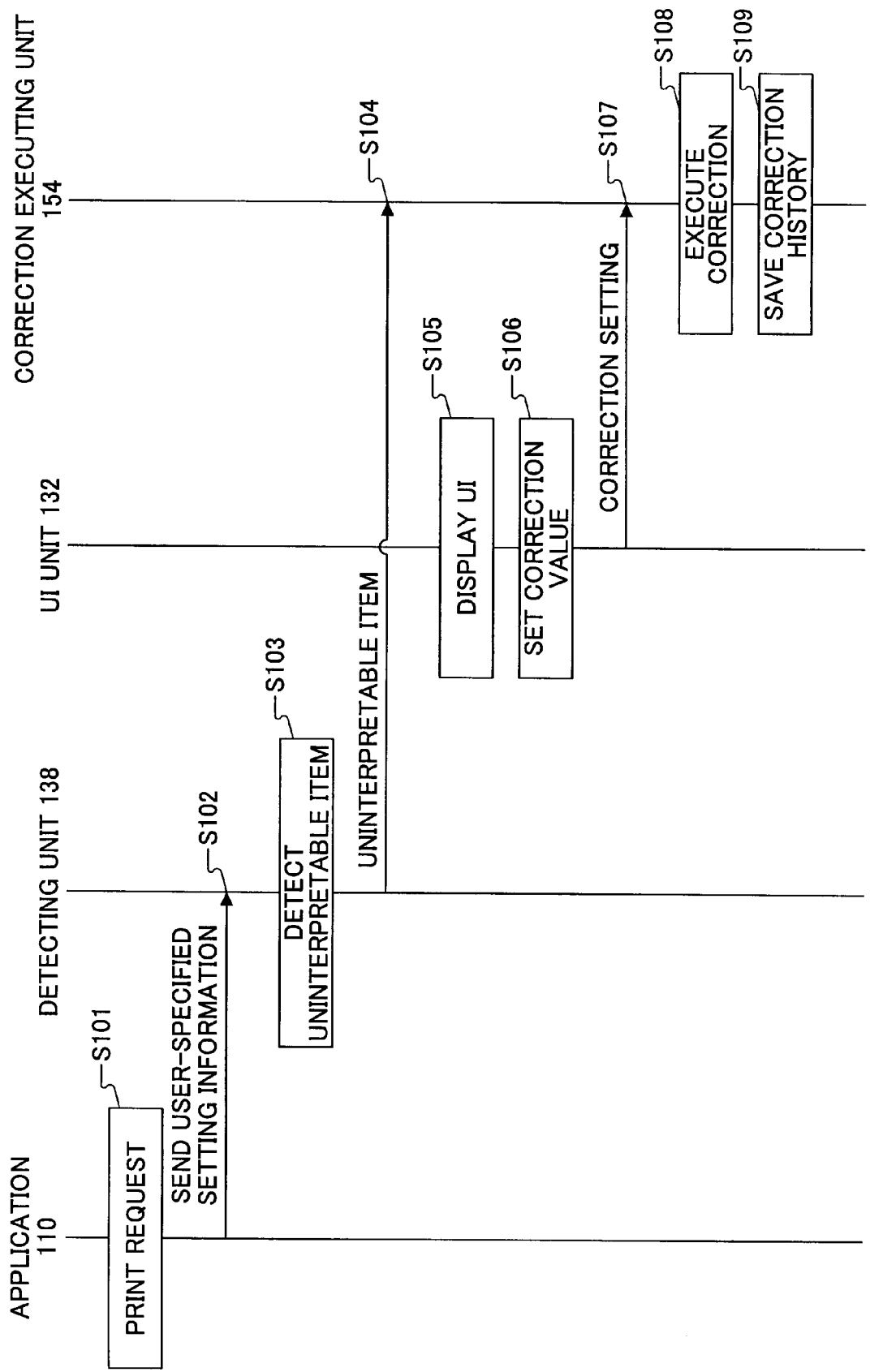
FIG. 9 is a sequence diagram illustrating a correction operation performed by the printer driver according to the first embodiment of the present invention.

For example, in the PC 10 of the present embodiment, certain document data created by the application 110 are printed out from the second printer 22, and subsequently, the same document data are printed out by the first printer 21. In this case, it is assumed that print settings are made in the first printing operation performed by the second printer 22. Accordingly, at the time of subsequently printing out the same document data with the first printer 21, the print setting information 80 (see FIG. 8), which has been set at the time of printing with the second printer 22, will have been stored in the setting value storage unit 114 of the application 110 in advance. With reference to FIG. 9, a description is given of an operation performed in a case where the user makes a print request without an accompanying specification of print settings for the first printer 21 under the above-described circumstances.

FIG. 9 is a sequence diagram illustrating a correction operation performed by the printer driver 130a shown in FIG. 4.

First, in step S101, the user makes a print request for the first printer 21 with an input device (not shown) such as a keyboard or a mouse. This print request does not accompany specification of print settings, and therefore the application 110 does not generate print setting information relevant to the first printer 21 as described with reference to FIGS. 5A through 7. Accordingly, in step S102, the printer driver 130a corresponding to the first printer 21 receives, with its data receiving unit 131, from the application 110, the previous print setting information stored in the setting value storage unit 114, i.e., the print setting information 80 relevant to the second printer 22 (see FIG. 8) in the present embodiment.

In step S103, in the first printer driver 130a, the detecting unit 138 refers to the function information schema 50 (see FIGS. 5A and 5B) relevant to the first printer 21, which schema is stored in the function information storage unit 136, and determines whether the print setting information 80 received from the application 110 includes an item or a value that is uninterpretable by the printer driver 130a. If an uninterpretable item is included, in step S104, the printer driver 130a will extract this item and pass it to the setting value correcting unit 150. In step S105, the setting value correcting unit 150 causes the UI unit 132 of the printer driver 130a to display a page for allowing a user to set an appropriate value for the item or value that is uninterpretable by the printer driver 130a. In step S106, the user inputs to the displayed page, correction contents for the item or value that is uninterpretable by the printer driver 130a.

In step S107, the setting value correcting unit 150 receives, from the printer driver 130a, the correction contents input by the user. The setting value correcting unit 150 will have already received, from the printer driver 130a, the uninterpretable item or value. Therefore, in step S108, the correction executing unit 154 corrects such an item or value to the appropriate value based on the correction contents input by the user. Subsequently, in step S109, the setting value correcting unit 150 saves correction history indicating how the uninterpretable information has been corrected as data in the correction data storage unit 152.

(Correction of Uninterpretable Item)

As described with reference to FIG. 9, the printer driver determines whether there is an item uninterpretable by the printer driver, in the print setting information received from the application 110. If there is, the target item is extracted. In the present embodiment, where the first printer 21 is selected as the printer to be used for the printing operation, the corresponding first printer driver 130a receives, from the application 110, previous print setting information, i.e., print setting information regarding the second printer 22. Therefore, in the first printer driver 130a, the detecting unit 138 refers to function information relevant to the first printer 21 stored in the function information storage unit 136, and detects an uninterpretable item from the print setting information received from the application 110. The function information relevant to the first printer 21 is expressed by the function information schema 50 shown in FIGS. 5A, 5B, and the print setting information (relevant to the second printer 22) sent from the application 110 is expressed by the print setting information 80 shown in FIG. 8. Comparing FIGS. 5A, 5B with FIG. 8, it can be found that the previous print setting information 80 shown in FIG. 8 includes items uninterpretable by the current first printer driver 130a, as indicated in FIG. 10.

FIG. 10 indicates the items uninterpretable by the first printer driver 130a in the print setting information relevant to the second printer 22. In FIG. 10, items uninterpretable by the first printer driver 130a are circled for the sake of description.

The print setting information 80 includes the sheet size setting item 8100 and the sheet size setting item 8100 includes the "A4" option 8110. Similarly, the function information schema 50 includes the sheet size setting item 5100 and the sheet size setting item 5100 includes the "A4" option 5110. However, the attribute names defined in the "A4" option 8110 included in the print setting information 80 are "MediaWidth" and "MediaLength" while the attribute names defined in the "A4" option 5110 included in the function information schema 50 are "MediaSizeX" and "MediaSizeY".

Furthermore, the print setting information 80 includes the punch setting item 8200, which is not included in the function information schema 50.

Accordingly, the first printer driver 130a cannot interpret these items of the print setting information 80 received from the application 110. In this case, the first printer driver 130a passes, to the setting value correcting unit 150, the items in the print setting information 80 that are uninterpretable by the printer driver 130a, the function information schema 50 relevant to the first printer 21 to be used for the printing operation, the user name of the user who made the print request, the application name of the application 110 that received the print request, and the data name of the document data to be printed. The first printer driver 130a can also pass the entire print setting information 80 to the setting value correcting unit 150.

Figure 11:
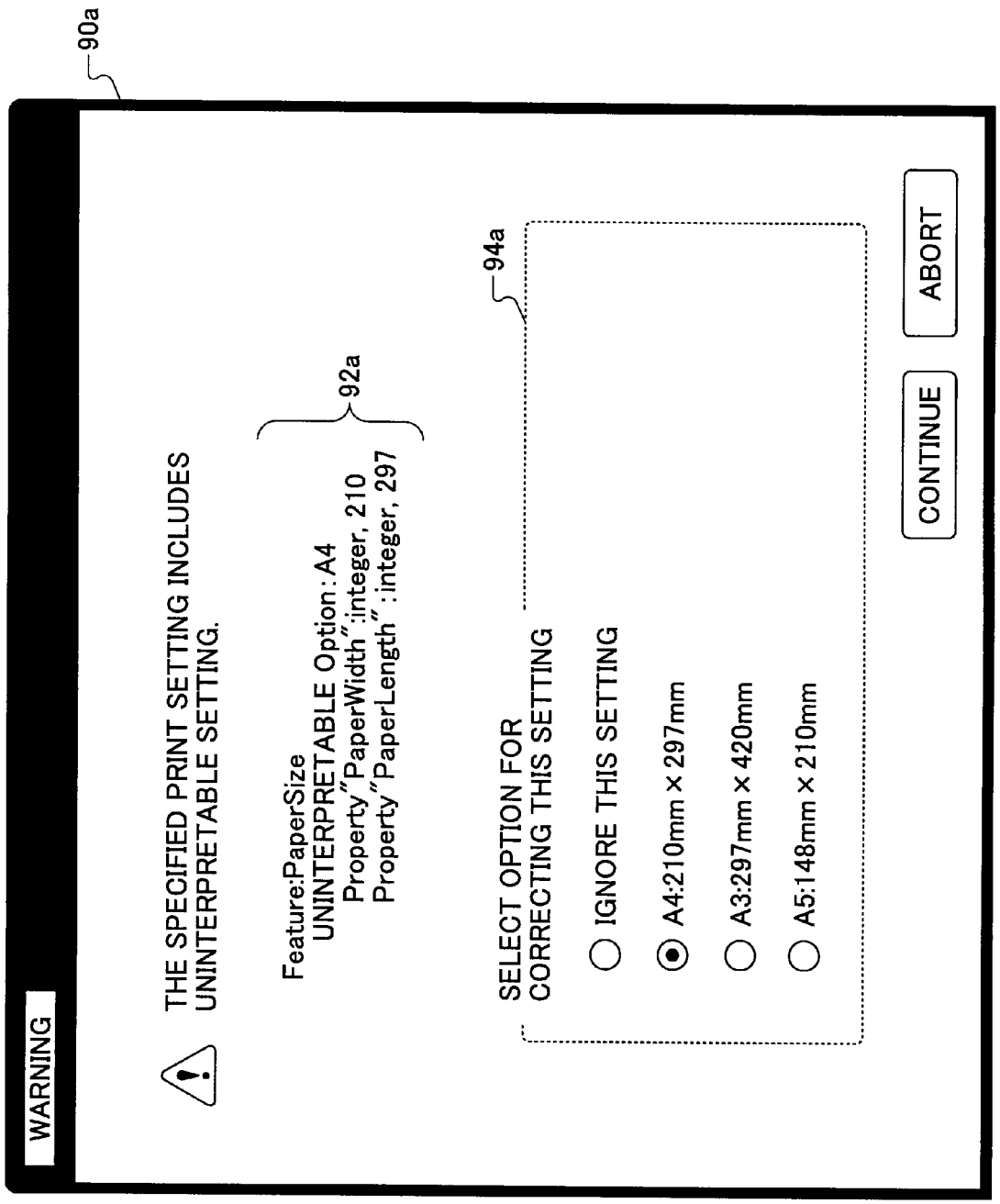
FIG. 11 illustrates an example of a correction request page for making a correction regarding an uninterpretable item included in the print setting information shown in FIG. 10.
Figure 12:
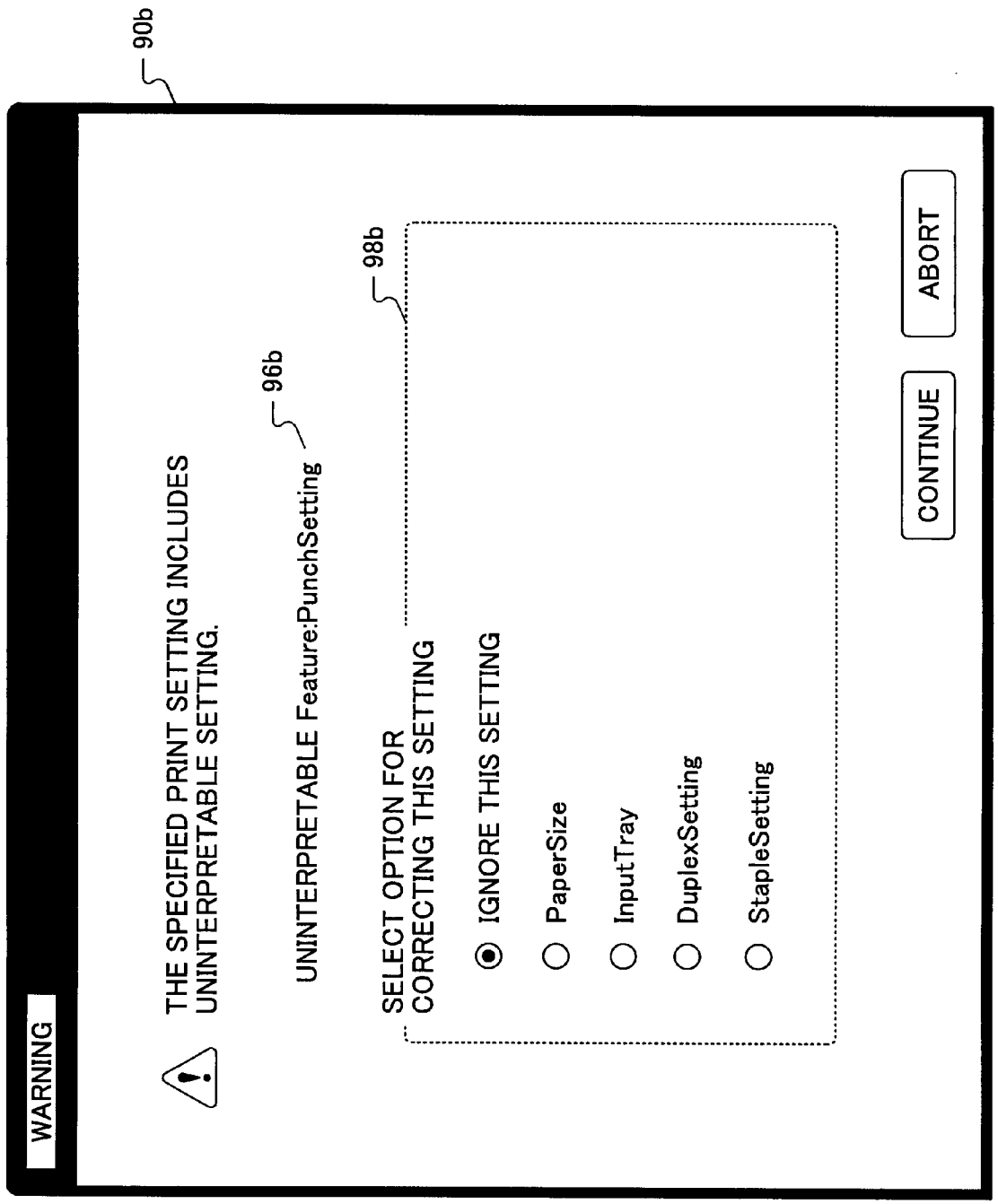
FIG. 12 illustrates an example of a correction request page for making a correction regarding another uninterpretable item included in the print setting information shown in FIG. 10.

Next, the setting value correcting unit 150 displays a correction request page as shown in FIGS. 11 and 12 on the UI unit 132 of the first printer driver 130a to ask the user how to correct the uninterpretable item.

FIG. 11 illustrates an example of a correction request page for making a correction regarding the "A4" option 8110 including attributes uninterpretable by the first printer driver 130a in the print setting information 80 shown in FIG. 10.

A correction request page 90a shown in FIG. 11 includes an indication 92a of contents of the uninterpretable "A4" option 8110 included in the print setting information 80 sent from the application 110, and a group box 94a including options for correcting the setting of the "A4" option 8110. The group box 94a includes options for ignoring this setting (which includes correcting it to be a standard value) or for correcting the setting to be any one of the setting values interpretable by the first printer driver 130a. In this case, the setting values interpretable by the first printer driver 130a are values defined by the options 5110, 5120, and 5130 of the sheet size setting item 5100 included in the function information schema 50 relevant to the first printer 21.

FIG. 12 illustrates an example of a correction request page for making a correction regarding the punch setting item 8200 that is uninterpretable by the first printer driver 130a in the print setting information 80 of FIG. 10.

A correction request page 90b shown in FIG. 12 includes an indication 96b of an item name of the uninterpretable punch setting item 8200 included in the print setting information 80 sent from the application 110, and a group box 98b including options for correcting the setting of the punch setting item 8200. The group box 98b includes options for ignoring this setting (which includes correcting it to a standard value or turning the setting "OFF") or for selecting to correct the setting to any one of the setting values interpretable by the first printer driver 130a. In this case, the setting values interpretable by the first printer driver 130a are values defined by the setting items 5100, 5200, and 5300 included in the function information schema 50 relevant to the first printer 21.

The user inputs correction contents according to the correction request pages shown in FIGS. 11 and 12. In the setting value correcting unit 150, the correction executing unit 154 corrects the uninterpretable item in the print setting information 80 to have an appropriate value based on the user's selection.

As described above, in a case where data are printed by a certain printer by specifying print setting values, and the same data are printed with a different printer based on the print setting values that have been set the first time, the following corrections can be made. That is, when an uninterpretable item is included in the setting values, such an item is not simply corrected to have a standard value, but is corrected to have a value selected by a user which is interpretable by the printer to be connected.

The above example describes a case where the print settings used for printing with a certain printer include an uninterpretable setting for printing with another printer. Furthermore, in a case where a print instruction is made for a printer that is not recognized by the printer driver, the printing operation can be appropriately performed by correcting an uninterpretable print setting to an interpretable print setting. That is, an uninterpretable print setting can be corrected to an interpretable print setting.

(Saving Correction History Data)

The setting value correcting unit 150 can save the correction contents as correction history data in the correction data storage unit 152 when a correction has been made for an item uninterpretable by the target printer driver.

FIG. 13 illustrates correction history data 300a to be stored in the correction data storage unit 152.

In the present embodiment, the correction history data 300a shown in FIG. 13 are in a table format, but the correction history data can be in other formats. The correction history data 300a include a history ID assigned for each correction executed, a user name, an application name, a document data name, a model name of the printer used for the printing operation, and setting items and option definitions before and after the correction in the print setting information sent from the application.

In the present embodiment, the option setting of the sheet size setting item 8100 included in the print setting information 80 sent from the application 110 is detected as an item uninterpretable by the first printer driver 130a, and is corrected. For example, it is assumed that the user corrects this option setting according to the setting request page shown in FIG. 11 so that the option setting becomes a setting value interpretable by the first printer driver 130a, i.e., a value defined by the first option 5110 of the sheet size setting item 5100 included in the function information schema 50 relevant to the first printer 21. In this case, after proper corrections have been executed, the following correction contents are saved in the correction history data 300a. Specifically, as shown in FIG. 13, the correction history data 300a indicate, for history ID "H1", that when a user "SUZUKI" has given an instruction to output a document "Doc1" from a "model A" (that is, the first printer 21) with the use of an application "WORD" (that is, the application 110), an "A4" option among the setting items of "PaperSize (which is a function name that can be recognized by the computer; this is displayed as "paper size" on a display device)" is uninterpretable, and therefore the "A4" option is corrected to be interpretable by the "model A". Similarly, if the punch setting item 8200 included in the print setting information 80 sent from the application 110 is detected as an uninterpretable item that needs to be corrected, and the user selects to ignore the setting of this item in the setting request page 90b shown in FIG. 12, the following correction contents are saved in the correction history data 300a. Specifically, as shown in FIG. 13, the correction history data 300a indicate, for history ID "H2", that when a user "SUZUKI" has given an instruction to output a document "Doc1" from a "model A" with the use of an application "WORD", the setting item of "Punch (which is a function name that can be recognized by the computer and displayed as "punch" on a display device)" is ignored ("Ignore").

If the correction history data 300a shown in FIG. 13 is saved beforehand, and a user having the same user name as that included in the correction history data 300a makes an instruction to output the same document data from a printer of the same model with the use of the same application, it will be determined that the same setting item that has previously been corrected is uninterpretable by the printer driver. In such a case, before causing the UI unit 132 to display the correction request pages 90a, 90b shown in FIGS. 11 and 12, respectively, the setting value correcting unit 150 displays a correction confirmation page as shown in FIG. 14 on the UI unit 132 of the first printer driver 130a to confirm whether the user will make the correction according to the correction contents saved as correction history data.

Figure 14:
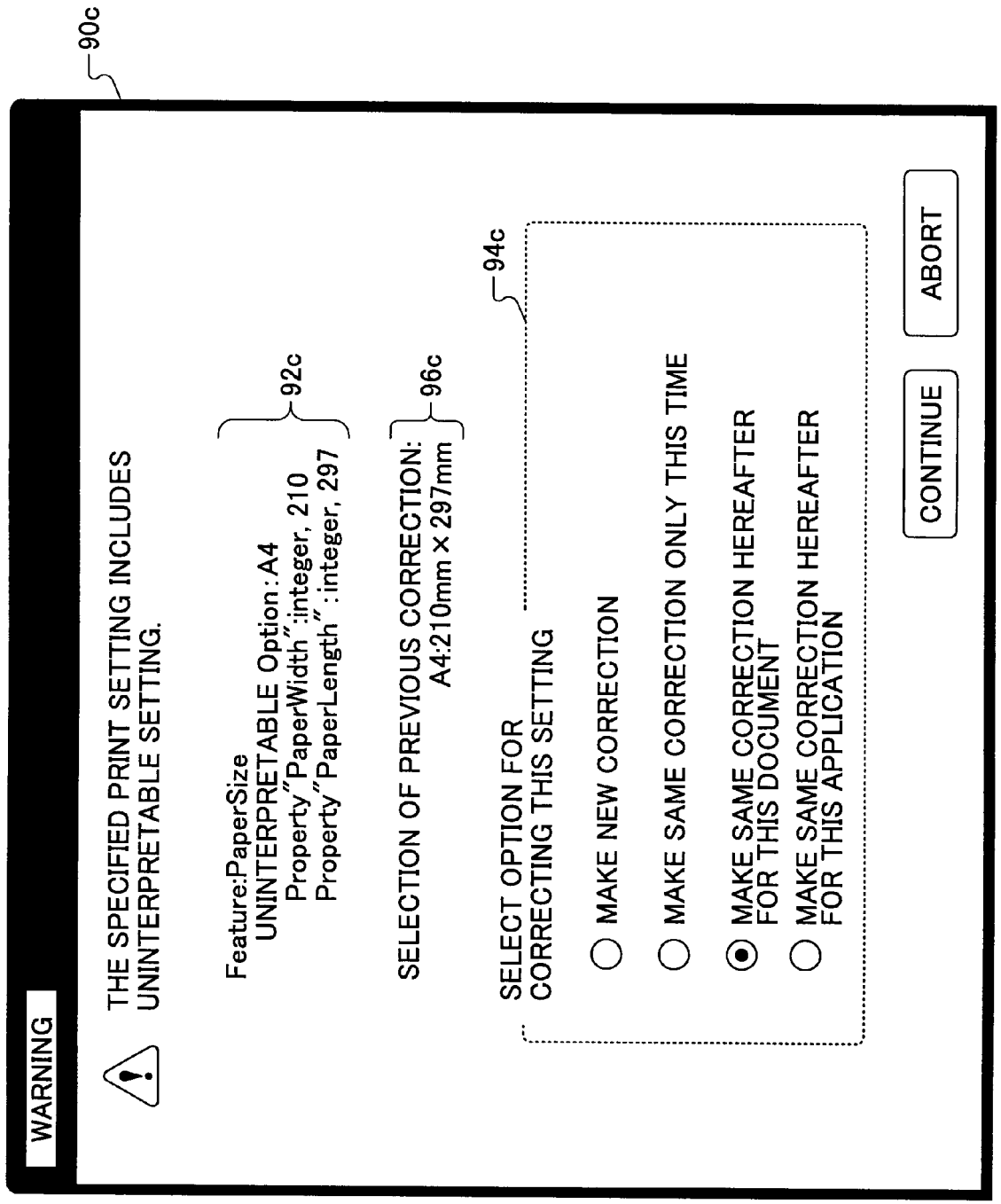
FIG. 14 illustrates a correction confirmation page which allows a user to select whether to execute a correction with the use of correction contents saved as correction history data shown in FIG. 13.

FIG. 14 illustrates a correction confirmation page which allows a user to select whether to execute a correction with the use of correction contents saved as correction history data.

A correction confirmation page 90c shown in FIG. 14 includes an indication 92c of contents of the uninterpretable "A4" option 8110 included in the print setting information 80 sent from the application 110, an indication 96c of correction contents of the correction previously made for the same document data by the same application, and a group box 94c including options for selecting whether to make corrections using the previous correction contents. The group box 94c includes an option for making a new correction, an option for making the same correction as the previous correction only this time, an option for making the same correction as the previous correction for this document hereafter (including this time), and an option for making the same correction as the previous correction for this application hereafter (including this time), and one of these are to be selected.

That is, the user inputs whether to repeatedly use the same correction contents, with the correction confirmation page 90c shown in FIG. 14. The setting value correcting unit 150 saves, in the correction data storage unit 152, this selection made by the user as repeat setting data.

FIG. 15 illustrates repeat setting data stored in the correction data storage unit 152.

In the present embodiment, repeat setting data 300b shown in FIG. 15 are in a table format, but the repeat setting data 300b can be in other formats. The repeat setting data 300b include a repeat ID assigned for each repeat setting for executing the correction using the previous correction contents saved as the correction history data 300a shown in FIG. 13, a selection user name of the user who selected to repeatedly use the previous correction contents for the correction, a history ID in the correction history data 300a assigned for the correction contents used for executing the repeated correction, and the condition for executing the repeated correction. The condition for executing the repeated correction refers to the contents of the option selected by the user from the group box 94c in the correction confirmation page 90c shown in FIG. 14.

In the present embodiment, the option setting of the sheet size setting item 8100 included in the print setting information 80 sent from the application 110 is detected as an item uninterpretable by the first printer driver 130a, and is corrected. These correction contents are given a history ID "H1" and are recorded in the correction history data 300a shown in FIG. 13. In this case, if the same user once again makes an instruction to output the same document by the same application, this time from the first printer 21, the setting value correcting unit 150 causes the UI unit 132 of the first printer driver 130a to display the correction confirmation page 90c shown in FIG. 14. If the user makes a selection in this page so that the same correction as the previous correction will be performed hereafter (including this time) if the document data to be printed out are the same as the previous document data, the following contents are saved in the repeat setting data 300b as repeat ID="R1", as shown in FIG. 15. Specifically, the contents indicate that a repeat instruction has been made for a user "SUZUKI" to make the contents of the history ID "H1" be "valid for document".

Figure 16:
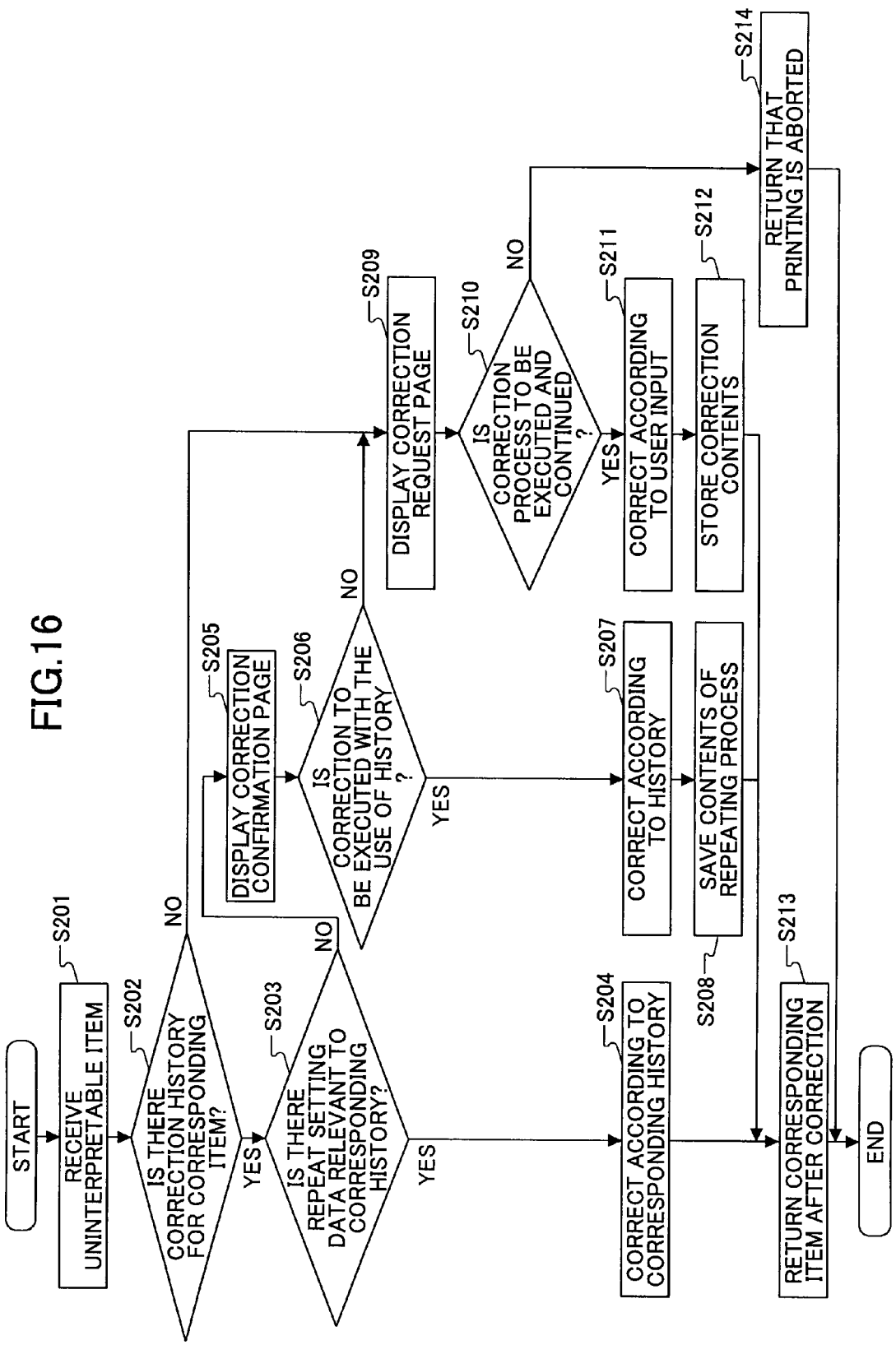
FIG. 16 is a flowchart for describing a correction operation performed by a setting value correcting unit according to the first embodiment of the present invention.

The correction operation performed by the setting value correcting unit 150 described above is illustrated in FIG. 16.

First, when the first printer driver 130a receives print setting information from the application 110 with the data receiving unit 131 and detects that an uninterpretable item is included in this print setting information with the detecting unit 138, in step S201, the setting value correcting unit 150 receives notice, from the first printer driver 130a, that the item that is uninterpretable by the first printer driver 130a in the print setting information, a function information schema relevant to the first printer 21 to be used for the printing operation, a user name of the user who made the print request, an application name of the application 110 that received the print request, and a data name of the document data to be printed out. The setting value correcting unit 150 can also receive all the print setting information from the first printer driver 130a. In this case, the detecting unit 138 can be provided in the setting value correcting unit 150 instead of the first printer driver 130a.

In step S202, based on the series of information items received, the setting value correcting unit 150 refers to correction history data stored in the correction data storage unit 152, and determines whether correction history for the corresponding item is recorded. When correction history is recorded, in step S203, based on the history ID assigned to the correction history, the setting value correcting unit 150 refers to the repeat setting data stored in the correction data storage unit 152, and determines whether there is repeat setting data relevant to the correction contents of the correction history. If repeat setting data are found, in step S204, the setting value correcting unit 150 corrects, with the correction executing unit 154, the corresponding item according to the correction contents of the correction history that is set to be repeated. After the correction, in step S213, the setting value correcting unit 150 sends the corrected item to the first printer driver 130a.

If it is determined in step S203 that there are no repeat setting data, in step S205 the setting value correcting unit 150 causes the UI unit 132 of the first printer driver 130a to display the correction confirmation page as shown in FIG. 14. In step S206, in the displayed correction confirmation page, the user selects whether to make the correction with the use of the previous correction contents. When the user selects to make the correction with the use of the previous correction contents, in step S207, the setting value correcting unit 150 corrects the corresponding item according to the correction contents of the previous correction history with its correction executing unit 154. After the correction, in step S208, the setting value correcting unit 150 stores the contents of the repeating process as repeat setting data in the correction data storage unit 152. Subsequently, in step S213, the setting value correcting unit 150 sends the corrected item to the first printer driver 130a.

If it is determined in step S202 that correction history is not recorded, or if the user selects not to make the correction with the use of the previous correction contents in step S206, in step S209, the setting value correcting unit 150 causes the UI unit 132 of the first printer driver 130a to display a correction request page as shown in FIGS. 11 and 12. In step S210, the user selects whether to correct the corresponding item in the displayed correction request page. If the user selects to correct the corresponding item, in step S211, the setting value correcting unit 150 corrects, with its correction executing unit 154, the corresponding item according to the correction contents set by the user in the correction request page. After the correction, in step S212, the setting value correcting unit 150 stores the correction contents as correction history data in the correction data storage unit 152. Subsequently, in step S213, the setting value correcting unit 150 sends the corrected item to the first printer driver 130a.

If the user does not select to correct the corresponding item in step S210, in step S214, the setting value correcting unit 150 does not make a correction and reports to the first printer driver 130a that the printing operation has been aborted.

As described above, when an item or a value that is uninterpretable by the printer is detected, and the item or value is the same as that detected previously, the corresponding item can be corrected as follows. That is, the corresponding item can be automatically corrected with the use of the previous correction contents without having the user make a selection, or the user can make a new selection to correct the item to be a value that is interpretable by the printer and selected by the user. Furthermore, in the present embodiment, such a selective correction can be made by specifying at least one of a user, an application, or data.

<Second Embodiment>

Next, a description is given of an embodiment according to the present invention in a case where plural users share correction data.

Figure 17:
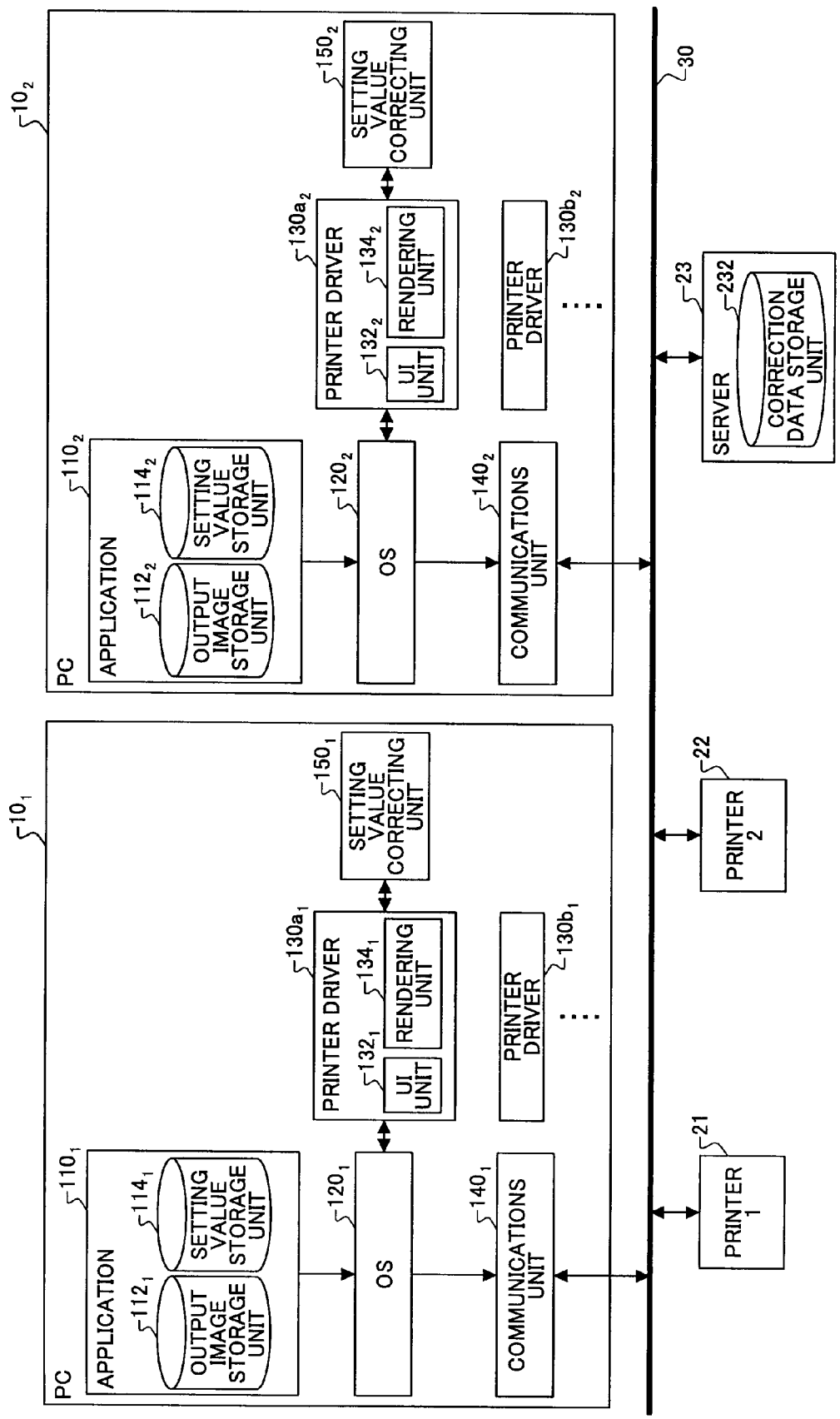
FIG. 17 illustrates an image forming system according to a second embodiment of the present invention.

An image forming system shown in FIG. 17 includes PC's 10$_1$ and 10$_2$, the first and second printers 21 and 22, a server 23, and the network 30 that connects these elements to each other to enable data communications.

The PC's 10$_1$ and 10$_2$ are connected to the first and second printers 21 and 22 and the server 23 via the network 30. The PC's 10$_1$ and 10$_2$ include applications 110$_1$ and 110$_2$, OS's 120$_1$ and 120$_2$, one or plural printer drivers 130$a_1$, 130$b_1$, . . . and 130$a_2$, 130$b_2$, . . . , communications units 140$_1$ and 140$_2$, and setting value correcting units 150$_1$ and 150$_2$, respectively.

The PC's 10$_1$ and 10$_2$ basically have the same configuration as that of the PC 10 according to the first embodiment as shown in FIG. 3. However, a correction data storage unit 232 is provided in the server 23 instead of being provided in the setting value correcting units 150$_1$ and 150$_2$ of the respective PC's.

If a user name is included in the correction history data stored in the correction data storage unit 232 as in the case of the correction history data 300a shown in FIG. 13, the setting value correcting units 150$_1$ and 150$_2$ report to the user that there is history of correction for the document data to be printed out, which correction had been executed by a user other than the current user. Furthermore, the setting value correcting units 150$_1$ and 150$_2$ cause the UI unit of the printer driver corresponding to the printer to be used for the printing operation to display a correction confirmation page as shown in FIG. 18, in order to ask whether the user will execute a correction with the use of contents of this correction history.

Figure 18:
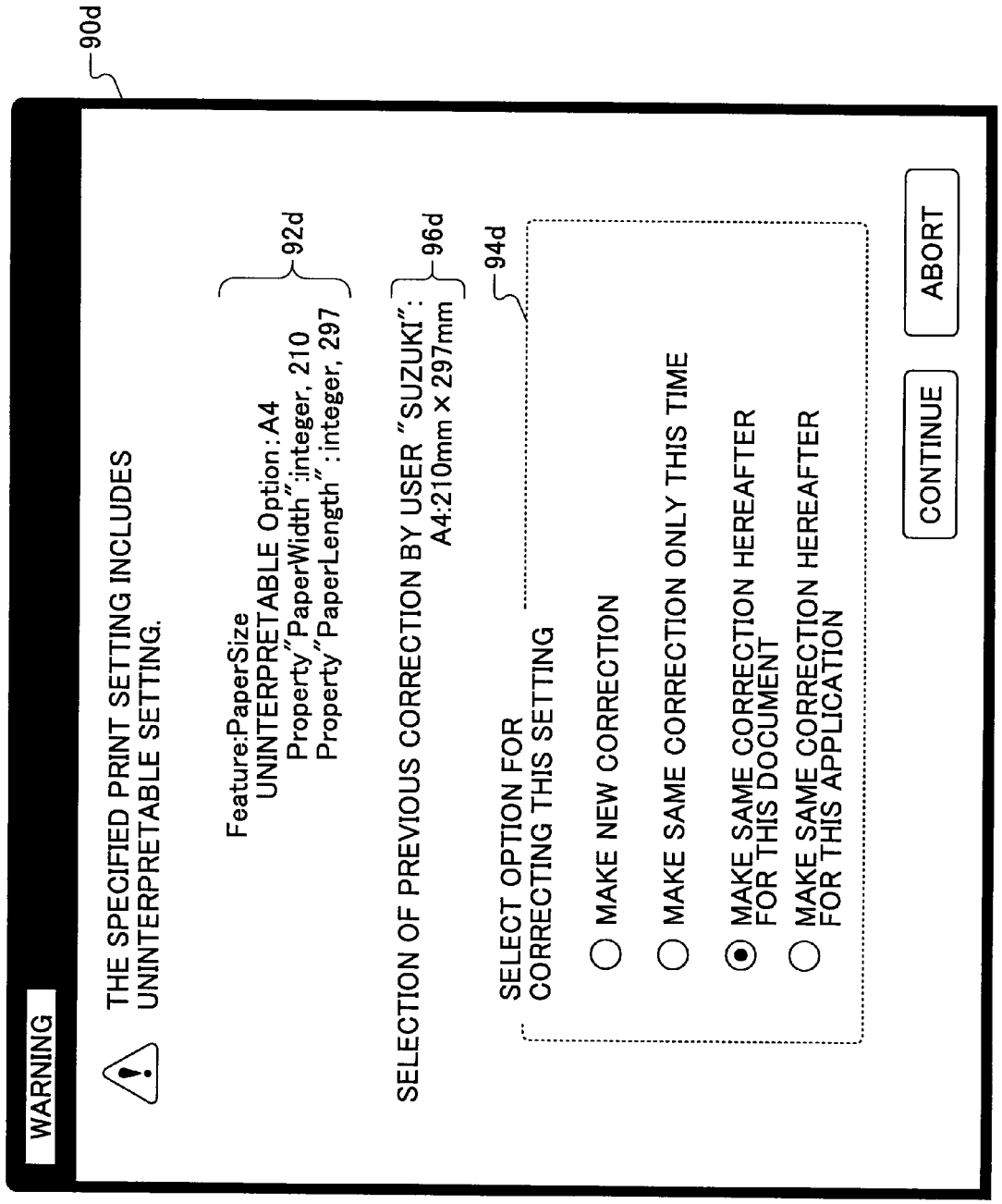
FIG. 18 illustrates an example of a correction confirmation page for selecting whether to execute a correction with the use of the correction contents saved by another user, which correction contents are saved in the correction history data shown in FIG. 13.

FIG. 18 illustrates a correction confirmation page for allowing a user to select whether to execute a correction with the use of the correction contents saved by another user in the correction history data.

If the print setting information 80 (see FIG. 8) sent from the application 110$_1$ of one of the PC's 10$_1$ includes an item uninterpretable by the first printer driver 130a corresponding to the first printer 21 to be used for the printing operation, a correction confirmation page 90d shown in FIG. 18 includes an indication 92d of contents of the uninterpretable "A4" option 8110 that is an uninterpretable item, an indication 96d for reporting that the print setting value for the same document data of the same application has been corrected by a different user and for reporting the correction contents, and a group box 94d including options for selecting whether to make corrections using the previous correction contents set by another user. As shown in FIG. 18, the indication 96d is displayed based on a user name and the setting item names before and after the correction included in the correction history data 300a (see FIG. 13) or an option definition.

In the present embodiment, a correction data storage unit is provided in a server that can be accessed by plural PC's connected to a network. It is useful for the correction history data to be shared by plural PC's in a case where different users are to print out unmodifiable master data used by plural users. In such a case, correction contents for print setting values of the master data set by a certain user can be used by another user.

<Modifications>

Figure 19:
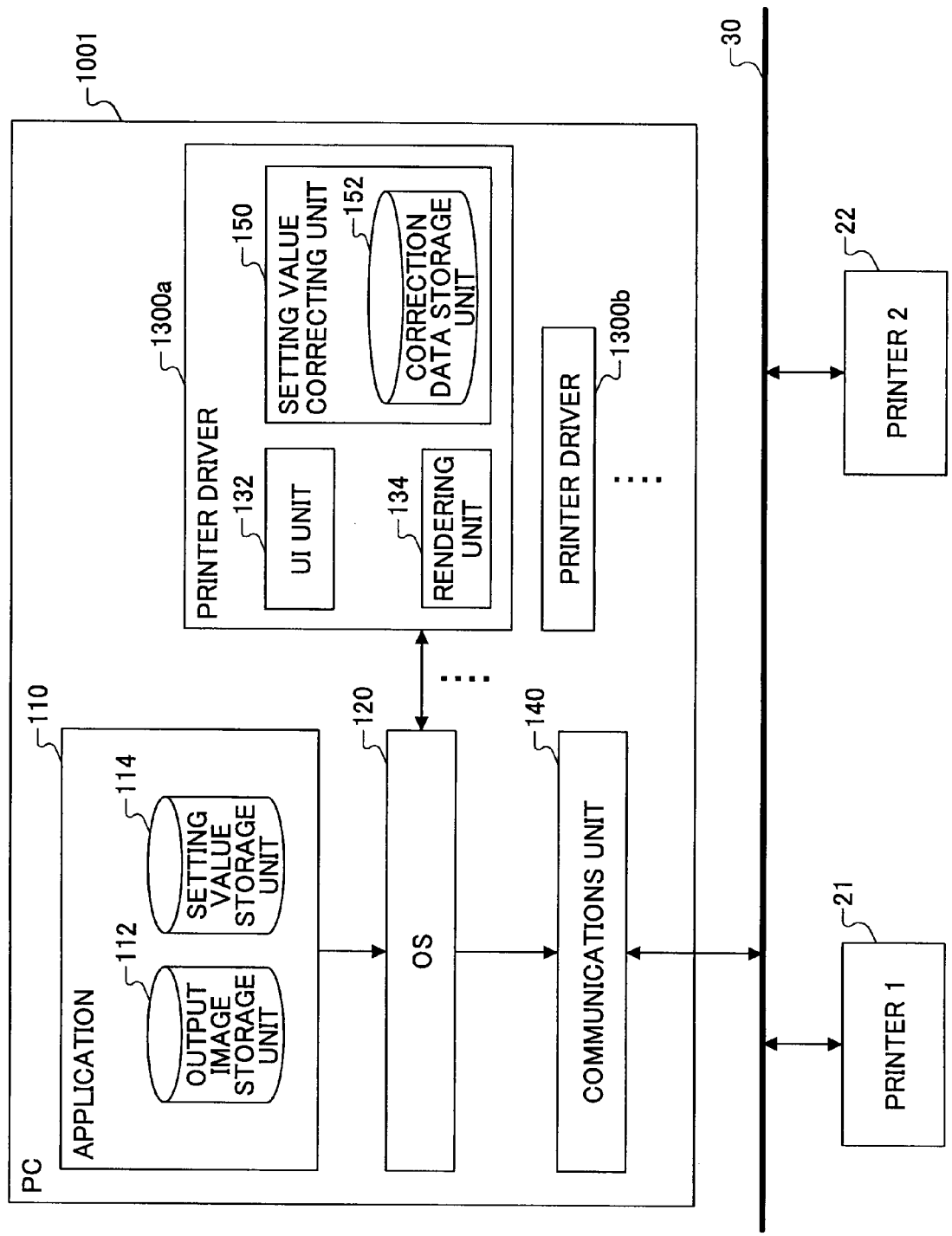
FIG. 19 illustrates a first modification of the image forming systems according to the first and second embodiments.
Figure 20:
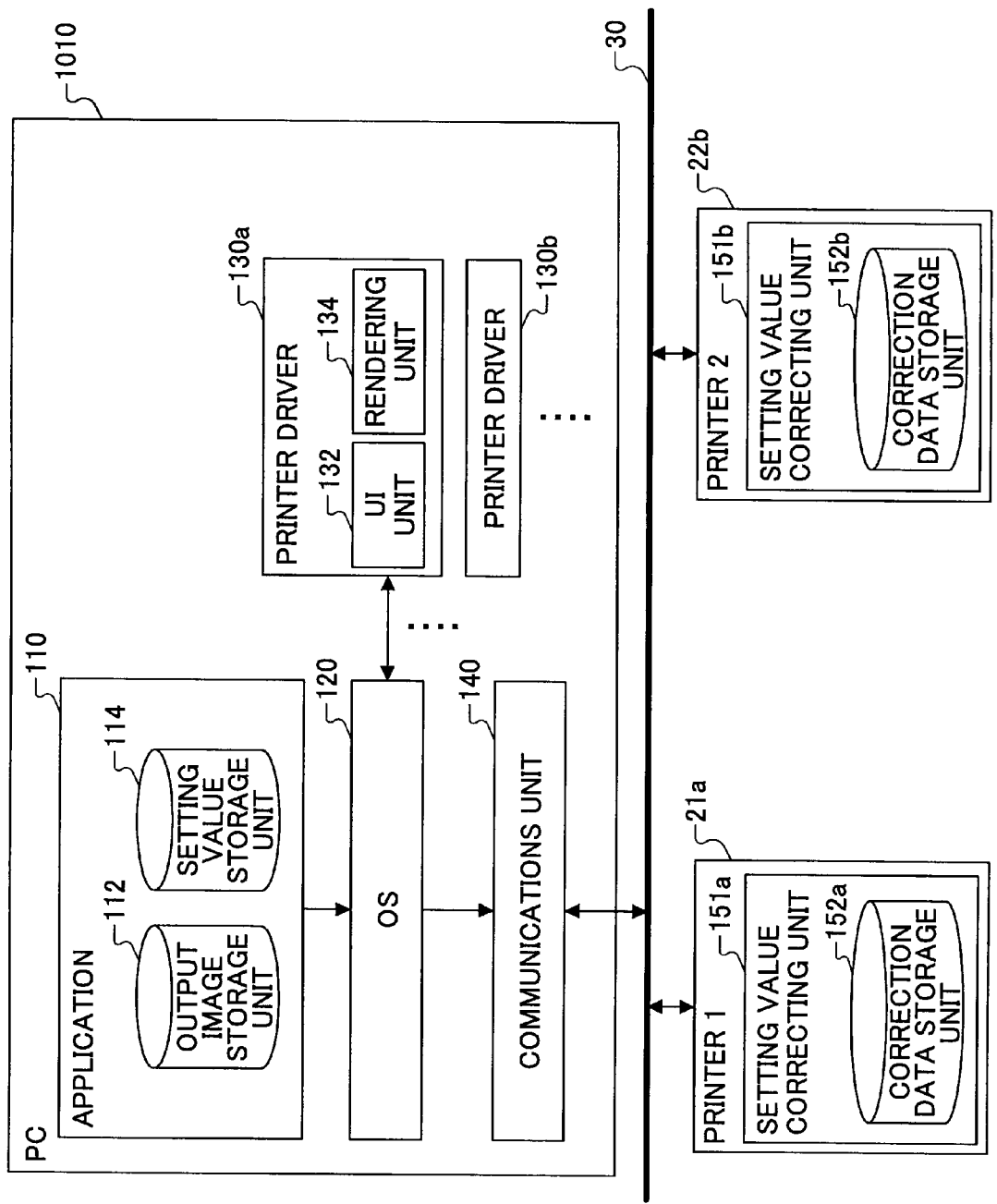
FIG. 20 illustrates a second modification of the image forming systems according to the first and second embodiments.
Figure 21:
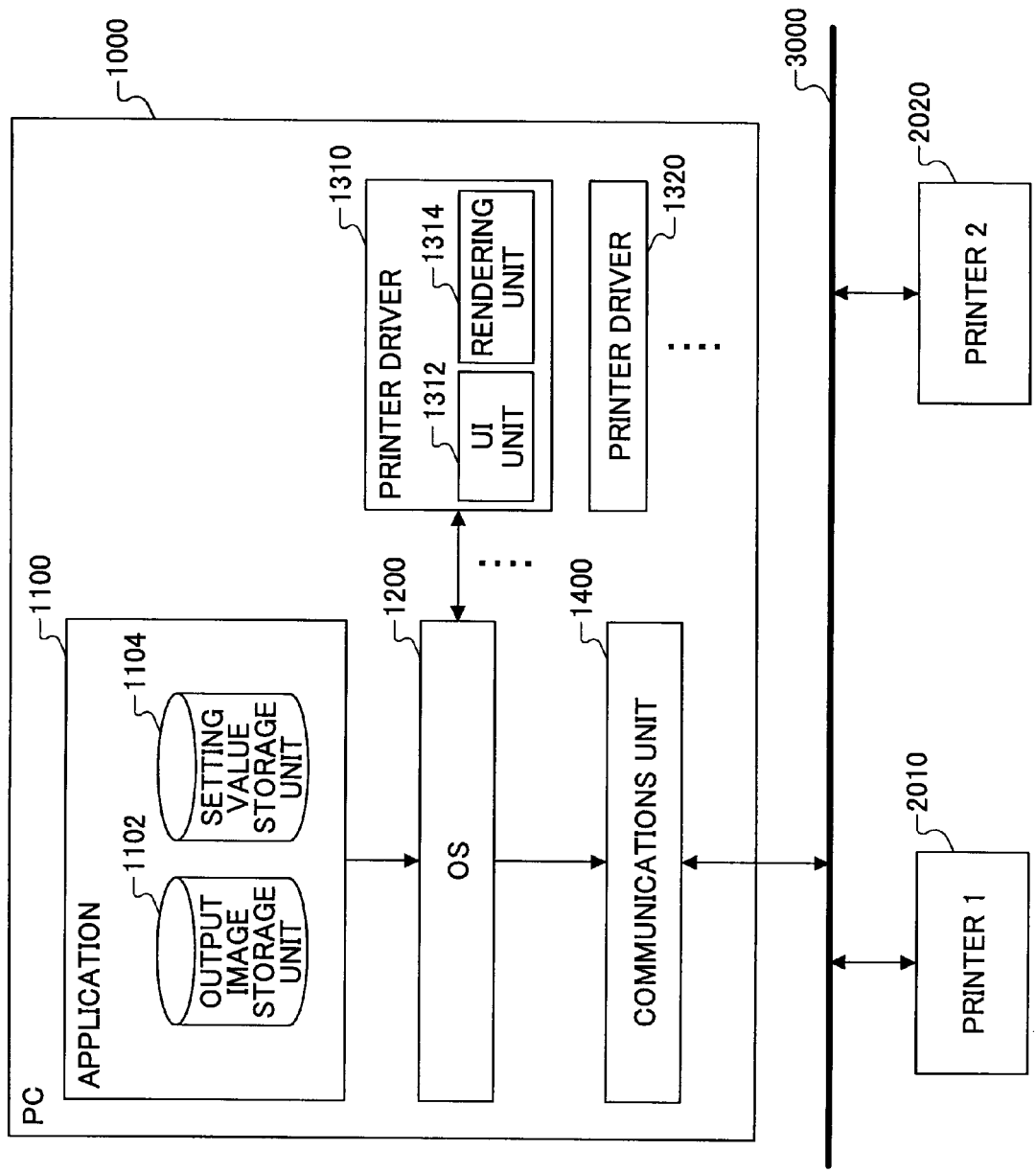
FIG. 21 is a functional block diagram of a computer in an image forming system according to the conventional technology.
Figure 22:
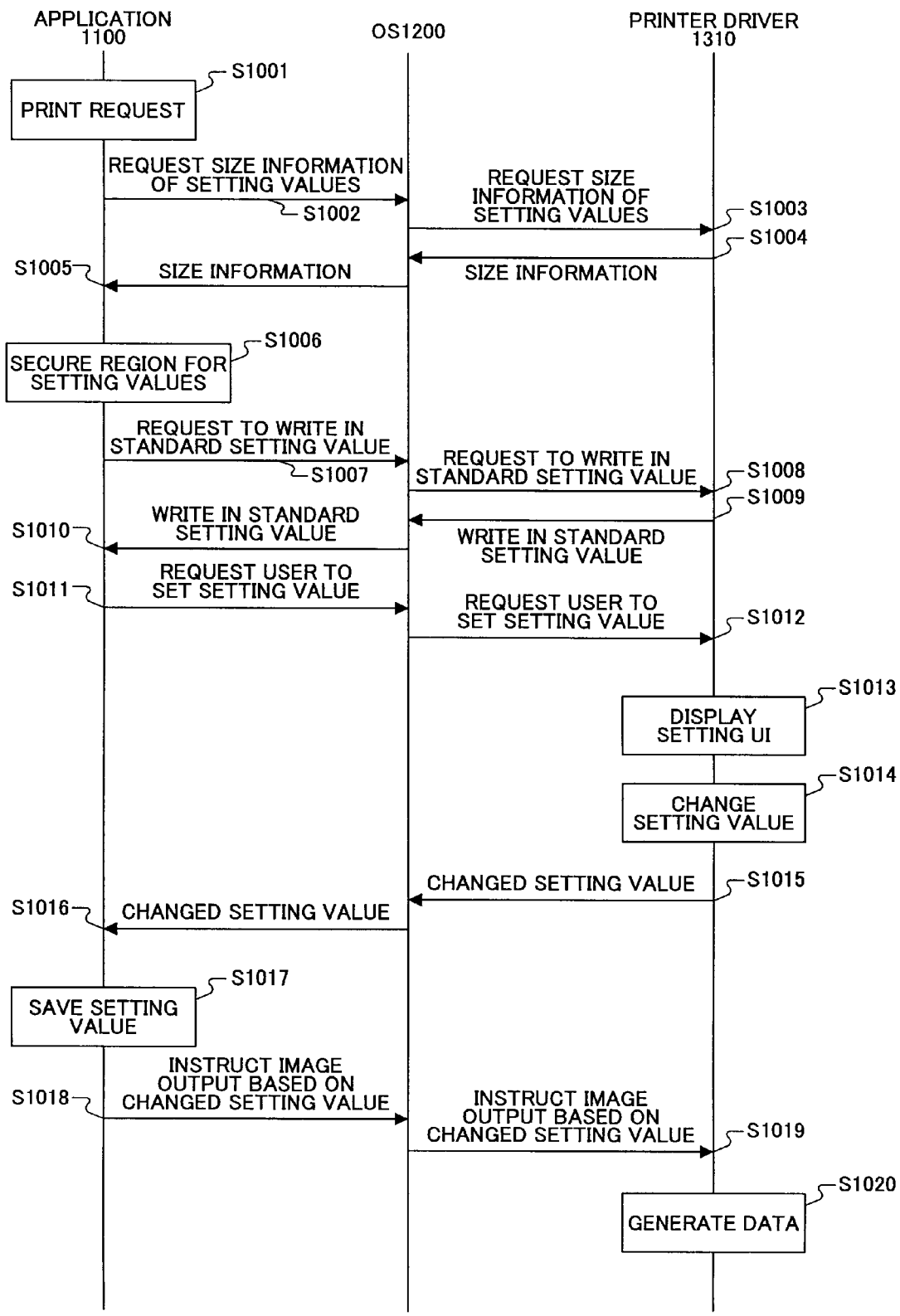
FIG. 22 illustrates a print setting operation flow of the conventional computer shown in FIG. 21.

In the above embodiments, the setting value correcting unit is provided separately from the printer driver; however, the setting value correcting unit can be included in the printer driver as shown in FIG. 19. Alternatively, as shown in FIG. 20, the setting value correcting unit can be provided in the printer. As shown in FIG. 20, when a setting value correcting unit is provided in each of the printers, the uninterpretable item or value included in print setting information or entirely uninterpretable print setting information that the printer driver receives from the application, is sent from the PC to the target printer via the network. In this case, if the print setting information can be described in an XML format as shown in FIGS. 7 and 8, the setting value correcting unit can be provided in the printer as a web service, and the contents of the print setting information can be expressed as a SOAP message by the application or the print driver.

Furthermore, in the above embodiments, a printer driver is described; however, the present invention is also applicable to other device drivers such as a scanner driver and a PC-FAX driver, as long as the driver is software for converting an instruction from the application into data interpretable by the device. Moreover, an embodiment of the present invention is not limited to the device driver or the module format conforming to the device driver; an embodiment of the present invention can be applied to the application itself.

Furthermore, the present invention can be realized by hardware in an information processing device, or by a program product that is loaded in a hard disk (HDD) or a read-only memory (ROM) and executed by a computer.

According to one embodiment of the present invention, an information processing apparatus is connected to an output device, which information processing apparatus includes a function information storage unit configured to store function information relevant to a function executable by the output device; a receiving unit configured to receive output setting information used when performing output; a detecting unit configured to detect, from the output setting information, an uninterpretable setting that is uninterpretable by the information processing apparatus, according to the output setting information received by the receiving unit and the function information stored in the function information storage unit; a display unit configured to display a page for selecting an option of an interpretable setting that is interpretable by the information processing apparatus, which interpretable setting corresponds to the uninterpretable setting detected by the detecting unit; and a correcting unit configured to make a correction for changing the uninterpretable setting into the interpretable setting that is interpretable by the information processing apparatus according to the option selected in the page displayed by the display unit.

Accordingly, even when a setting that is uninterpretable to the information processing apparatus is included in the received output setting information, such a setting is not simply changed into a standard value but is changed into a setting that can be interpreted by the information processing apparatus, and that is selected by a user.

Additionally, according to one embodiment of the present invention, the information processing apparatus preferably further includes a correction information storage unit configured to save the contents of the correction made by the correcting unit as correction history information, wherein the correction history information includes the uninterpretable setting detected by the detecting unit and the contents of the correction made to the uninterpretable setting by the correcting unit.

Accordingly, a setting that has previously been detected as being uninterpretable can be automatically corrected with the previous correction contents, without requiring the user's selection.

Additionally, according to one embodiment of the present invention, in the information processing apparatus, the correction history information preferably further includes at least one of a user name, an application name, and a data name relevant to the output setting information.

Accordingly, if there is a setting that has previously been detected as being uninterpretable with respect to a certain user or data on application or certain data, the setting can be automatically corrected with the previous correction contents, without requiring the user's selection.

Additionally, according to one embodiment of the present invention, in the information processing apparatus, it is preferable that in the event that the correcting unit determines, by referring to the correction history information, that the uninterpretable setting detected by the detecting unit has been corrected to be a predetermined interpretable setting, the correcting unit causes the display unit to display a page for selecting whether to correct the uninterpretable setting to said predetermined interpretable setting.

Accordingly, with respect to a setting that has previously been detected as being uninterpretable, it is possible to prompt a user to make a selection as to whether the setting is to be automatically corrected with the previous correction contents.

According to one embodiment of the present invention, a program product includes instructions for causing an information processing apparatus connected to an output device to perform a detecting step of detecting, from output setting information, an uninterpretable setting that is uninterpretable by the information processing apparatus, according to the output setting information used when performing output and function information relevant to a function executable by the output device; a displaying step of displaying a page for selecting an option of an interpretable setting that is interpretable by the information processing apparatus, which interpretable setting corresponds to the uninterpretable setting detected in the detecting step; and a correcting step of making a correction for changing the uninterpretable setting into the interpretable setting that is interpretable by the information processing apparatus according to the option selected in the page displayed in the displaying step.

According to one embodiment of the present invention, the program product is recorded in a computer-readable recording medium.

The present invention is not limited to the specifically disclosed embodiment, and variations and modifications may be made without departing from the scope of the present invention.

The present application is based on Japanese Priority Patent Application No. 2007-093637, filed on Mar. 30, 2007, the entire contents of which are hereby incorporated by reference.

What is claimed is:

1. An information processing apparatus connected to an output device, the information processing apparatus comprising:
    a memory configured to store function information relevant to a function executable by the output device;
    an interface configured to receive output setting information used when performing an output;
    a detecting unit configured to detect, from the output setting information, an uninterpretable setting that is uninterpretable by the information processing apparatus, according to the output setting information received by the interface and the function information stored in the memory;
    a display configured to display a page that indicates the uninterpretable setting and provides a selection option to correct the uninterpretable setting into an interpretable setting that is interpretable by the information processing apparatus, the interpretable setting corresponding to the uninterpretable setting detected by the detecting unit;
    a correcting unit configured to make, via a processor, a correction for changing the uninterpretable setting into the interpretable setting that is interpretable by the information processing apparatus according to the option selected in the page displayed by the display; and
    a correction information storage unit configured to store contents of the correction made by the correcting unit as correction history information, and to store repeat setting information for making the same correction as a past correction when the uninterpretable setting, which has been corrected in the past and which is included in the correction history information, is detected again.

2. The information processing apparatus according to claim 1, wherein the correction history information includes the uninterpretable setting and the contents of the correction made to the uninterpretable setting.

3. The information processing apparatus according to claim 2, wherein the correction history information further comprises at least one of a user name, an application name, and a data name relevant to the output setting information.

4. The information processing apparatus according to claim 3, wherein in the event that the correcting unit determines, by referring to the correction history information, that the uninterpretable setting has been corrected to be a predetermined interpretable setting, the correcting unit determines whether the repeat setting information is not stored for the uninterpretable setting, and when the repeat setting information is not stored, the correcting unit causes the display to display a page for selecting whether to correct the uninterpretable setting to be said predetermined interpretable setting and for selecting whether to repeat the correction to the said predetermined interpretable setting when the uninterpretable setting is detected again.

5. The information processing apparatus according to claim 2, wherein in the event that the correcting unit determines, by referring to the correction history information, that the uninterpretable setting has been corrected to be a predetermined interpretable setting, the correcting unit determines whether the repeat setting information is not stored for the uninterpretable setting, and when the repeat setting information is not stored, the correcting unit causes the display to display a page for selecting whether to correct the uninterpretable setting to be said predetermined interpretable setting and for selecting whether to repeat the correction to the said predetermined interpretable setting when the uninterpretable setting is detected again.

6. A computer implemented method for executing an output process in an image processing apparatus when uninterpretable information is included in output setting information the method comprising:
    a detecting step of detecting, from output setting information, an uninterpretable setting that is uninterpretable by the information processing apparatus, according to the output setting information used when performing an output and function information relevant to a function executable by an output device;
    a displaying step of displaying a page that indicates the uninterpretable setting and provides a selection option to correct the uninterpretable setting into an interpretable setting that is interpretable by the information processing apparatus, the interpretable setting corresponding to the uninterpretable setting detected in the detecting step;
    a correcting step of making a correction for changing the uninterpretable setting to be the interpretable setting that is interpretable by the information processing apparatus according to the option selected in the page displayed in the displaying step; and
    a storing step of storing contents of the correction made by the correcting step as correction history information, and storing repeat setting information for making the same correction as a past correction when the uninterpretable setting, which has been corrected in the past and which is included in the correction history information, is detected again.

7. A non-transitory computer-readable recording medium storing computer readable instructions thereon that when executed by a computer cause the computer to perform the method according to claim 6.

8. The method according to claim 6, wherein the correction history information includes the uninterpretable setting and the contents of the correction made to the uninterpretable setting.

9. The method according to claim 8, wherein the correction history information further includes at least one of a user name, an application name, and a data name relevant to the output setting information.

10. The method according to claim 9, further comprising:
    a determining step for determining, in the event that it is determined, by referring to the correction history information, that the uninterpretable setting has already been corrected to be the predetermined interpretable setting, whether the repeat setting information is not stored for the uninterpretable setting; and
    a second displaying step of displaying, when the repeat setting information is not stored, a page for selecting whether to correct the uninterpretable setting to be a predetermined interpretable setting and for selecting whether to repeat the correction to the predetermined interpretable setting when the uninterpretable setting is detected again.

11. The method according to claim 8, further comprising:
    a determining step for determining, in the event that it is determined, by referring to the correction history information, that the uninterpretable setting has already been corrected to be the predetermined interpretable setting, whether the repeat setting information is not stored for the uninterpretable setting; and
    a second displaying step of displaying, when the repeat setting information is not stored, a page for selecting whether to correct the uninterpretable setting to be a predetermined interpretable setting and for selecting whether to repeat the correction to the said predetermined interpretable setting when the uninterpretable setting is detected again.

* * * * *